United States Patent
Dennis et al.

(10) Patent No.: US 11,350,288 B1
(45) Date of Patent: May 31, 2022

(54) USE OF AUGMENTED REALITY FOR PLACEMENT OF A SMALL CELL

(71) Applicant: T-MOBILE INNOVATIONS LLC, Overland Park, KS (US)

(72) Inventors: Drew Dennis, Lenexa, KS (US); Ricky A. Hohler, Olathe, KS (US); Prasad Pappula, Overland Park, KS (US); Sadanand Pawar, Overland Park, KS (US); Hemant Vasant Tiwari, Overland Park, KS (US); Callie Eliza Warren, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 10 days.

(21) Appl. No.: 16/505,222

(22) Filed: Jul. 8, 2019

Related U.S. Application Data

(60) Provisional application No. 62/742,089, filed on Oct. 5, 2018.

(51) Int. Cl.
| | |
|---|---|
| *H04W 16/18* | (2009.01) |
| *H04W 16/26* | (2009.01) |
| *H04W 16/32* | (2009.01) |
| *H04W 16/28* | (2009.01) |
| *H04W 64/00* | (2009.01) |
| *G06T 19/00* | (2011.01) |
| *H04W 72/04* | (2009.01) |
| *H04W 4/029* | (2018.01) |
| *G06V 20/20* | (2022.01) |

(52) U.S. Cl.
CPC .......... *H04W 16/18* (2013.01); *G06T 19/006* (2013.01); *G06V 20/20* (2022.01); *H04W 4/029* (2018.02); *H04W 16/26* (2013.01); *H04W 16/28* (2013.01); *H04W 16/32* (2013.01); *H04W 64/003* (2013.01); *H04W 72/042* (2013.01)

(58) Field of Classification Search
CPC ..... H04W 16/18; H04W 16/28; H04W 16/26; H04W 64/003; H04W 72/042; H04W 16/32; H04W 4/029; G06K 9/00671; G06T 19/006
See application file for complete search history.

(56) References Cited

U.S. PATENT DOCUMENTS

| | | | |
|---|---|---|---|
| 5,894,407 | A | 4/1999 | Aakalu et al. |
| 8,954,083 | B1 | 2/2015 | Yenney et al. |
| 9,924,433 | B2 | 3/2018 | Kim et al. |
| 10,051,594 | B1 | 8/2018 | Ramamurthy |
| 2004/0125965 | A1 | 7/2004 | Alberth, Jr. et al. |
| 2005/0079877 | A1 | 4/2005 | Ichimura |
| 2007/0149186 | A1 | 6/2007 | Barbosa da Torre et al. |

(Continued)

OTHER PUBLICATIONS

Notice of Allowance dated Jul. 21, 2020 in U.S. Appl. No. 16/706,223, 13 pages.

(Continued)

*Primary Examiner* — Mazda Sabouri

(57) ABSTRACT

Systems and methods are provided for facilitating the placement of a small cell, wherein at least one of a first set of parameters is determined at each of a first and a second position, and a recommended small cell placement position is generated and displayed on a user interface using augmented reality, based on at least one of the first set of parameters.

18 Claims, 17 Drawing Sheets

(56) References Cited

U.S. PATENT DOCUMENTS

| | | |
|---|---|---|
| 2008/0186901 A1 | 8/2008 | Itagaki et al. |
| 2009/0003637 A1 | 1/2009 | Pansell et al. |
| 2012/0242495 A1 | 9/2012 | Aguirre et al. |
| 2013/0242964 A1 | 9/2013 | Hassan et al. |
| 2015/0078162 A1 | 3/2015 | Prakash et al. |
| 2015/0181481 A1 | 6/2015 | Masini et al. |
| 2015/0289181 A1 | 10/2015 | Bromell et al. |
| 2015/0312771 A1 | 10/2015 | Li |
| 2015/0327082 A1 | 11/2015 | Kadel et al. |
| 2015/0334612 A1 | 11/2015 | Ray Chaudhuri et al. |
| 2016/0014613 A1* | 1/2016 | Ponnampalam ...... H04L 41/145 370/254 |
| 2016/0037356 A1* | 2/2016 | Bathula ................ H04W 16/18 455/446 |
| 2016/0081135 A1 | 3/2016 | Kang et al. |
| 2016/0135210 A1 | 5/2016 | Nammi et al. |
| 2016/0157106 A1 | 6/2016 | Randall et al. |
| 2016/0337917 A1 | 11/2016 | Kawai et al. |
| 2017/0048775 A1 | 2/2017 | Kim |
| 2017/0150365 A1* | 5/2017 | Goswami ............. H04W 16/18 |
| 2017/0181006 A1 | 6/2017 | Vardarajan et al. |
| 2018/0040252 A1* | 2/2018 | Anandappan ........ G08G 5/0021 |
| 2018/0376456 A1 | 12/2018 | Tsutsui |

OTHER PUBLICATIONS

Preinterview First Office Action dated Feb. 7, 2020 in U.S. Appl. No. 16/503,109, 4 pages.

Notice of Allowance dated May 17, 2021 in U.S. Appl. No. 16/503,109, 9 pages.

Non-Final Office Action dated Nov. 12, 2021 in U.S. Appl. No. 16/503,109, 20 pages.

* cited by examiner

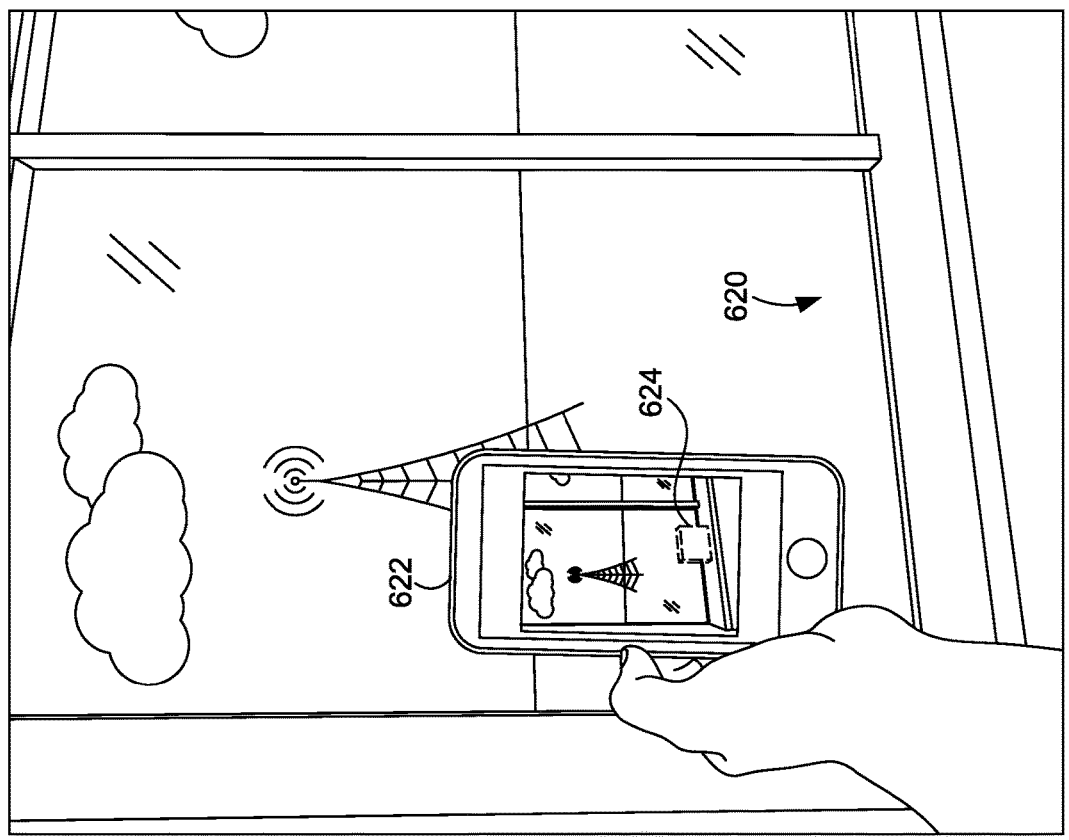

USE OF AUGMENTED REALITY FOR PLACEMENT OF A SMALL CELL

CROSS-REFERENCE TO RELATED APPLICATIONS AND PRIORITY CLAIM

This application claims the benefit of US Provisional Patent Application No. 62/742,089, filed Oct. 5, 2018, entitled "Determining Placement of a Small Cell," the entire contents of which is incorporated herein by reference.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

The present disclosure is directed, in part, to determining the placement of a small cell, substantially as shown in and/or described in connection with at least one of the figures, and as set forth more completely in the claims.

In aspects set forth herein, this disclosure describes, among other things, systems, methods, and/or computer readable media assist a customer and/or a technician to locate the best location to place a small cell in a house or building. Modern cellular networks are susceptible to high and low gain areas; low gain areas may be the result of, for example, propagation loss, building material attenuation, the beamforms of base stations, distance from the base station, or many other natural, and/or man-made causes. Such losses and low gain areas (particularly in a relatively high noise/interference environment) can result in user equipment (UE) being unable to maintain a voice or data session (or experience reduced throughput) with a wireless communications network, such as a wireless telecommunication network. Part of a solution to said technical problem is via the deployment of small cells to provide an improved wireless footprint for UEs proximate to the small cell. The effectiveness of a deployed small cell to remedy network coverage gaps is largely dependent on the placement of the small cell, both with respect to a connected base station and to connected UEs. Thus, where a small cell should be placed is a more specific technical problem spurred by modern wireless communication networks, their limitations, and the increasing demand of UEs and users for more stable and higher bandwidth wireless sessions. As one skilled in the art would appreciate, the present disclosure is a technical solution to that specific technical problem.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein:

FIGS. 6A-6C illustrates the display of a visual indicator for placement of a small cell, in accordance with aspects herein are depicted.

DETAILED DESCRIPTION

Figure 1:
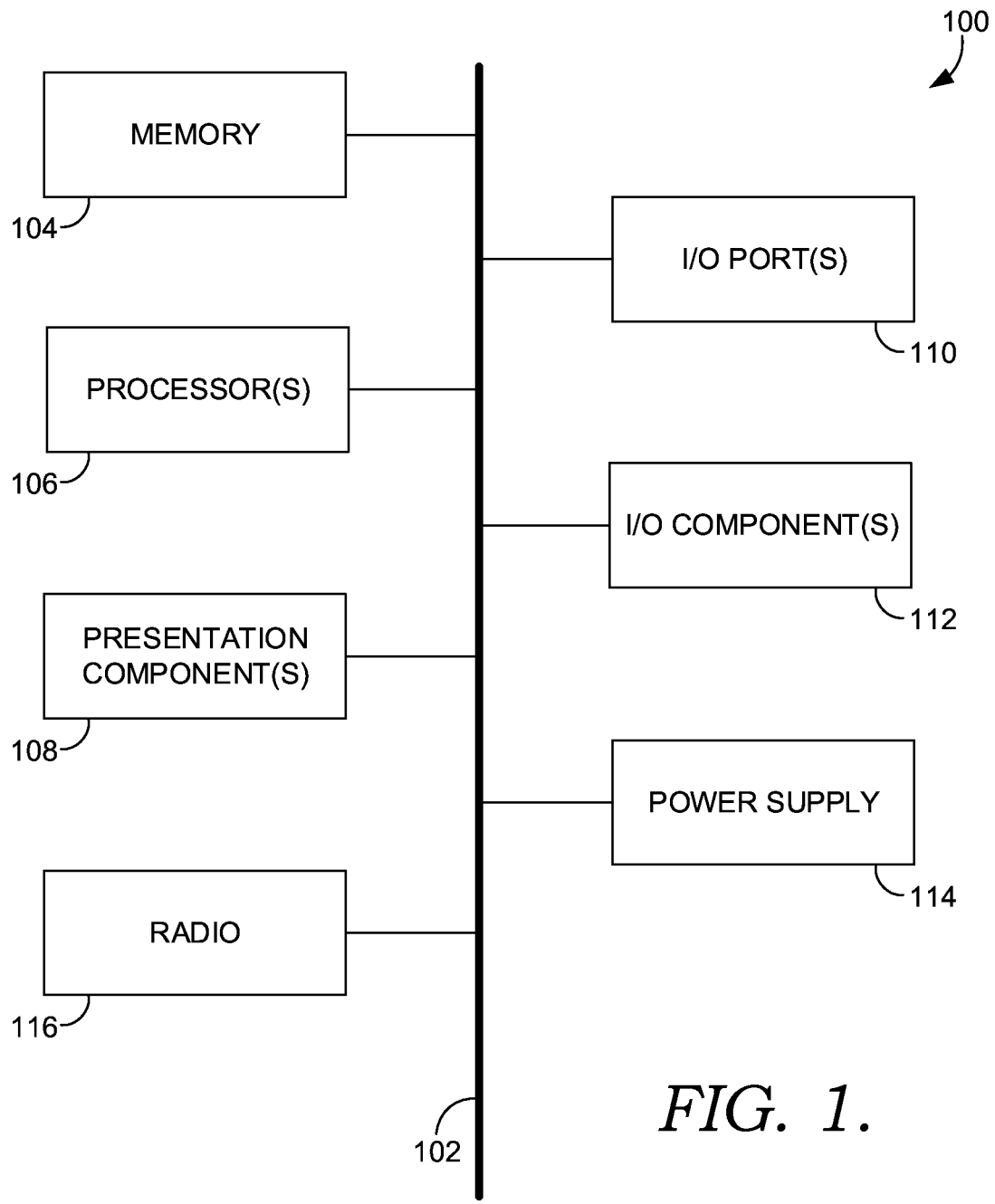
FIG. 1 depicts a diagram of an exemplary computing environment suitable for use in implementations of the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
CD-ROM Compact Disk Read Only Memory
CDMA Code Division Multiple Access
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple Input Multiple Output
MD Mobile Device
PC Personal Computer
PCS Personal Communications Service
PDA Personal Digital Assistant
RAM Random Access Memory
RET Remote Electrical Tilt RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
SON Self-Organizing Networks
TDMA Time Division Multiple Access
TXRU Transceiver (or Transceiver Unit)
UE User Equipment
UMTS Universal Mobile Telecommunications Systems
WCD Wireless Communication Device (interchangeable with UE)

Further, various technical terms are used throughout this description. An illustrative resource that fleshes out various aspects of these terms can be found in Newton's Telecom Dictionary, 25th Edition (2009).

Embodiments of our technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, a UE, and/or various other network or user devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., cell sites, cell towers) to provide network coverage. The base stations are employed to broadcast and transmit transmissions to user devices of the telecommunications network. In aspects, a base station is defined by its ability to communicate with a UE according to various wireless communication protocols (e.g., 3G, 4G, LTE, 5G, and the like); however, the RF signals exchanged between a UE and the base station may be affected by any number of natural or artificial phenomenon that may affect the gain of the RF signals. For example, if a UE is in the middle of a high rise office building, it may have a significantly reduced ability to communicate with the base station because of the reflection from the building's windows, the layers of construction materials (e.g., interior walls) between the UE and the base station, and/or noise created near the UE's location or anywhere in the path of the RF signal between the UE and the base station. In order to improve the ability of a UE to wirelessly communicate with a base station, a small cell may be used. At a high level, a small cell functions by establishing a backhaul connection with the base station and acts as a substitute access point for the UE, generally increasing gain (and likely throughput).

As may be appreciated, the placement of a small cell impacts its ability to serve the UE. Many customers simply place the small cell in a window or in an area with high anticipated usage (e.g., a conference room); however, these locations do not take in to consideration the backhaul parameters of the candidate placement location. The present disclosure solves the technical problem of where to place a small cell by setting forth systems, methods, and computer readable media for facilitating the placement of a small cell. In accordance with aspects herein, at least one of a first set of parameters is determined at each of a first approximate location and a second approximate location, the first set of parameters comprising signal quality and signal strength, at least one of a first set of parameters is determined at each of the first approximate location and the second approximate location, the second set of parameters comprising download speed and upload speed, and a recommended small placement location is generated based on at least one of the first set of parameters and the second set of parameters. By using the first and second parameters to determine a small cell placement location, the service provided by the small cell to the UE may be improved by way of an improved backhaul connection between the small cell and the base station.

As used herein, "base station" is one or more transmitters or receivers or a combination of transmitters and receivers, including the accessory equipment, necessary at one location for providing a service involving the transmission, emission, and/or reception of radio waves for one or more specific telecommunication purposes to a mobile station (e.g., a UE), wherein the base station is not intended to be used while in motion in the provision of the service. In an exemplary aspect, a base station may take the form of a macro cell; however, in other aspects, a base station may be a small cell or a wireless internet router. A "macro cell" refers to a land station in a wireless communication network that provides larger areas of wireless telecommunication coverage (e.g., greater than 2 km in radius), often located on a tower, mast, rooftop, or other elevated structure, and a "small cell" refers to a land or mobile station that provides smaller areas of wireless telecommunication coverage (e.g., less than 2 km in radius) that operate by providing a telecommunication link between a mobile station and a macro cell via a relay backhaul (e.g., a network connection with the macro cell). Non-limiting examples of a small cell include microcells, picocells, femtocells, and the like. The term/abbreviation UE (also referenced herein as a user device or wireless communications device (WCD)) can include any device employed by an end-user to communicate with a telecommunications network, such as a wireless telecommunications network. A UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station. A UE may be, in an embodiment, similar to device 100 described herein with respect to FIG. 1.

As further used herein, user devices that are spatially distributed with respect to a particular location (such as a candidate small cell placement location) may be said to be in different locations relative to the particular location. That is, a first device's location may be described herein as being farther from the particular location, relative to a second device. Such distance-related terminology may be a distance at ground level between the ground level of the particular location and the ground level of the device, the distance actually traveled by the signal (in aspects, affected by multipath, reflection, etc), and/or a signal strength (e.g., a first device is farther from an access point than a second device based on the downlink signal received at the first device being weaker than the downlink signal received at the second device).

Accordingly, a first aspect of the present disclosure is directed to a system for facilitating the placement of a small cell, the system comprising: a first macro cell and a UE, wherein the UE comprises one or more antennas for receiving a first downlink signal from the first macro cell and for transmitting a first uplink signal to the first macro cell, a user interface, and a processor. In aspects, the processor may be configured to determine one or more of a first set of parameters for each of the first approximate location and a second approximate location, the first set of parameters comprising at least one of the signal quality, a signal strength, and a distance and azimuth to the first macro cell. The processor may also be configured to determine one or more of the second set of parameters for each of the first approximate location and the second approximate location, the second set of parameters comprising at least one of the downlink speed of the first downlink signal and an uplink speed the first uplink signal. Further, the processor may generate a recommended small cell placement location for display on the user interface based on at least one parameter of the first set of parameters and at least one parameter of the second set of parameters.

In a second aspect, the present disclosure is directed to a method for facilitating the placement of a small cell. The method includes determining, using one or more antennas of a UE for receiving a first downlink signal from the first base station, one or more of a first set of parameters for each of the first approximate location and a second approximate location, the first set of parameters comprising at least one of the signal quality, signal strength, and a distance and azimuth to the first base station. The method further comprises determining, using the one or more antennas of the UE, one or more of the second set of parameters for each of the first approximate location and second approximate location, the second set of parameters comprising at least one of the downlink speed of the first downlink signal and an uplink speed of a first uplink signal, the first uplink signal transmitted to the first base station by the UE. Based on at least one parameter of the first set of parameters and at least one parameter of the second set of parameters, a recommended small cell placement location is generated for display on a user interface of the UE.

Another aspect of the present disclosure is directed to a non-transitory computer storage media storing computer-useable instructions that, when used by one or more processors cause the processors to determine, using one or more antennas of a UE for receiving a first downlink signal from the first base station, one or more of a first set of parameters for each of the first approximate location and a second approximate location, the first set of parameters comprising at least one of the signal quality, signal strength, and a distance and azimuth to the first base station. The instructions further comprise determining, using the one or more antennas of the UE, one or more of the second set of parameters for each of the first approximate location and second approximate location, the second set of parameters comprising at least one of the downlink speed of the first downlink signal and an uplink speed of a first uplink signal, the first uplink signal transmitted to the first base station by the UE. Based on at least one parameter of the first set of parameters and at least one parameter of the second set of parameters, a recommended small cell placement location is generated for display on a user interface of the UE.

Referring to FIG. 1, a diagram is depicted of an exemplary computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 may be a UE, UE, or other user device, capable of two-way wireless communications with an access point. Some non-limiting examples of the computing device 100 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108 (e.g., a graphic user interface of a UE), input/output (I/O) ports 110, I/O components 112, a power supply 114 and one or more radios 116. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

The at least one radio 116 facilitates communication with a wireless telecommunications network. In aspects, the radio 116 utilizes a transceiver and/or a combination of transmitters and receivers to wirelessly communicate with the telecommunications network. Illustrative wireless telecommunications technologies that may be used by the radio 116 to wirelessly communicate with the telecommunications network that include CDMA, GPRS, TDMA, GSM, and the like. The radio 116 may additionally or alternatively facilitate other types of wireless communications including Wi-Fi, WiMAX, LTE, 3G, 4G, LTE, 5G, NR, VoLTE, or other VoIP communications. As can be appreciated, in various embodiments, radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
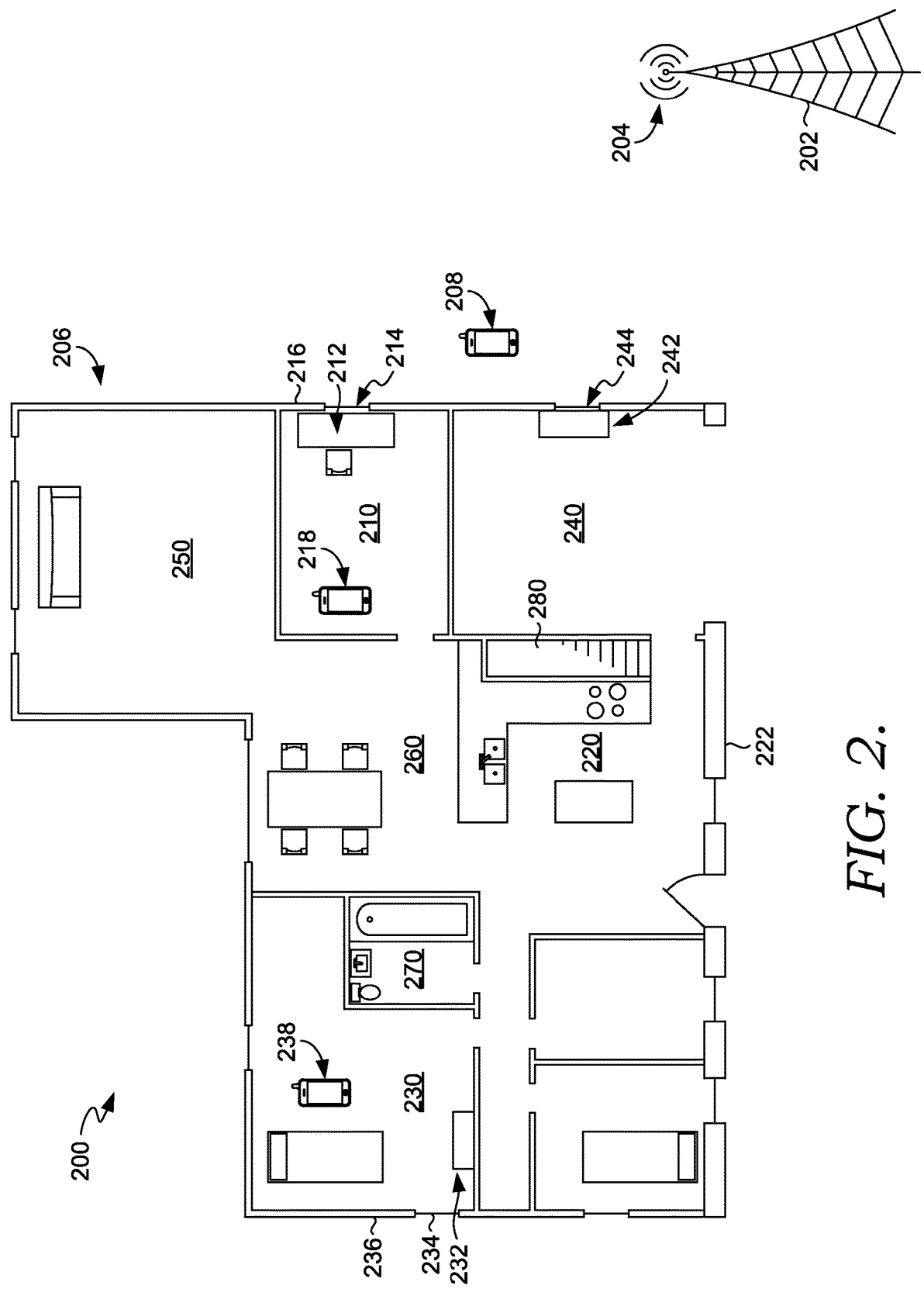
FIG. 2 illustrates a diagram of an exemplary system environment in which implementations of the present disclosure may be employed.

FIG. 2 provides an exemplary system environment in which implementations of the present disclosure may be employed. Such a system environment is illustrated and designated generally as system environment 200. System environment 200 is but one example of a suitable system environment and is not intended to suggest any limitation as to the scope of use or functionality of the invention. Neither should the system environment be interpreted as having any dependency or requirement relating to any one or combination of components illustrated. Accordingly, any one or more components or aspects of the system environment may comprise a system consistent with the present disclosure.

System environment 200 depicts a building 206, a base station 202, a first user device 208, a second user device 218, in a third user device 238. It is expressly conceived that more or fewer user devices may exist in the system environment 200. In the exemplary aspect of FIG. 2, the user devices 208, 218, and 238 are depicted as mobile telephones; however, in other aspects, user devices 208, 218 and 238 may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 100) that wirelessly communicates with a telecommunications network or any portion thereof, such as the base station 202.

In some aspects, the user devices (items 208, 218, and 238) can correspond to computing device 100 in FIG. 1. Thus, a user device can include, for example, a display(s), a power source(s) (e.g., a battery), a data store(s), a speaker(s), memory, a buffer(s), a radio(s) and the like. In some implementations, a user device (items 208, 218, and 238) comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, the user devices (items 208, 218, and 238) in system environment 200 can optionally utilize one or more telecommunications networks to communicate with other computing devices (e.g., a mobile device(s), a server(s), a personal computer(s), etc.) through base station 202 of a telecommunications provider that provides services (e.g., LTE) to user devices, such as user devices 208, 218, and 238. For example, the one or more telecommunication networks may provide voice, SMS, and/or data services to user devices or corresponding users that are registered or subscribed to utilize the services provided by the telecommunications provider. The one or more telecommunication networks may provide voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network. The one or more telecommunications networks might include an array of devices or components (e.g., one or more base stations), some of which are not shown. Components such as terminals, links, and nodes (as well as other components) can provide connectivity in various implementations; however, the details of the telecommunication network architecture is not so as to not obscure other aspects of the present disclosure.

The base station 202 may take the form of any land station configured to wirelessly communicate using one or more transceivers, transmitters, and/or receivers, with one or more user devices. In exemplary aspect base station 202 may comprise a macro cell, wherein the macro cell is configured to provide wireless radio communication services to user devices in order to access the telecommunication network. The macro cell may comprise a nodeB, eNodeB, gNodeB, AIR interface, MIMO, or other wireless communication technology that similarly function by wirelessly communicating signals to and from user devices while being communicatively coupled to a telecommunications network. In aspects, the macro cell may serve a sector, such as a 120° sector, in other aspects the macro cell may serve all or a portion of a 360° cell. In the exemplary embodiment of FIG. 2, the base station 202 is located on a tower. In other aspects, the base station 202 may be located on a mast, rooftop, or on any other, preferably elevated, structures.

Base station 202 may transmit and/or receive a signal 204. In aspects, the signal 204 is a downlink signal wirelessly transmitted from the base station 202 to any one or more user devices, such as the user devices 208, 218, and 238, in order that they may wirelessly communicate with the telecommunications network. In other aspects, the signal 204 is an uplink signal wirelessly transmitted from one or more user devices, such as the user devices 208, 218, and 238, to the base station 202, in order that they may wirelessly communicate with the telecommunications network.

As mentioned, the system environment 200 comprises a building 206. In the exemplary aspect shown in FIG. 2, the building 206 is depicted as a dwelling. In other aspects, the building 206 may be a commercial site such as an office, storefront, high rise, conference center, or fixed site. In other aspects the building 206 may not be a building at all, and may instead take the form of a mobile location, such as a mobile business, food truck, recreational vehicle, or any other mobile site where signal gain facilitated by a small cell is desirable.

As discussed above, it may be more difficult for user devices such as the second user device 218 and the third user device 238 to wirelessly communicate with the base station 202, compared to the first user device 208, due to the fact that they are located within the building 206. For example, in an exemplary aspect, the signal 204 may comprise a downlink signal at 2.5 GHz, in other aspects, the downlink signal may be at 1900 MHz, 1700 MHz, 2100 MHz, 700 MHz, 850 MHz, 600 MHz, or any other frequency or frequency band approved by the FCC for a wireless telecommunications. In another exemplary aspect the signal 204 may comprise an uplink signal at any one or more of the frequencies described above. Generally speaking, the wireless signal 204, whether an uplink signal or downlink signal, may experience attenuation and/or reflection by any one or more materials or properties of the building 206, resulting in a signal reaching its intended destination with lower gain. This phenomenon may reduce the ability of the user device such as the second user device 218 and the third user device 238 from establishing and/or maintaining a signal with the base station 202, or may reduce throughput (e.g., during a data session). To mitigate the loss in gain, a small cell may be placed in the building 206 using a system 201

As an illustrative example of a building in which a small cell may be placed, the building 206 comprises a plurality of rooms, such as an office 210, a kitchen 220, a bedroom 230, a garage 240, a living room 250, a dining room 260, a bathroom 270, and a basement 280. The office 210 may comprise a desk 212, an office window 214, a first exterior wall 216, and the second user device 218. The kitchen 220 may be at least partially defined by an exterior stone wall 222, wherein the exterior stone wall 222 is significantly thicker than each of the first exterior wall 216 and a second exterior wall 236. The bedroom 230 may comprise a dresser 232, a bedroom window 234, the second exterior wall 236, and the third user device 238. The garage 240 may comprise a workbench 242, and a garage window 244.

In order to best serve the building 206, a placement location for small cell may be based on the small cell's ability to communicate with the base station 202 and/or its ability to improve gain for the second user device 218 and the third user device 238 located within the building 206. If the small cell is placed in the garage 240, on, for example the workbench 242, it may receive the highest gain of signal 204, as the signal 204 need only propagate through the garage window 244 or the first exterior wall 216. However, the user may have no knowledge of an azimuth to the closest base station or an azimuth to a base station having the greatest signal strength realized at the building 206 (which may not be the closest base station). Further, if the small cell is placed in the garage 240 the signal from the small cell may be attenuated through multiple layers of building materials in order to reach devices such as the third user device 238 located across the building 206 in the bedroom 230, possibly providing only modest improvements over the third user device 238's ability to communicate with the base station 202. Placing the small cell in other locations may have an impact on any one or more parameters of the signal 204 and the ability of the small cell to establish, maintain, and/or optimize a backhaul connection to the base station 202. For example, if the small cell is placed in the kitchen 220, the signal 204 must propagate through the thick exterior stone wall 222, likely resulting in high signal attenuation and thus lower signal strength. If the small cell is placed in the bedroom 230, the signal 200 for not only may attenuate through the various portions of the building 206, a multi-path version of the signal 204 may enter through the bedroom window 234 or the second exterior wall 236, affecting the quality of the signal 204 and the ability for the small cell to successfully establish, maintain, and/or optimize backhaul connection to the base station 202.

In an aspect of the present disclosure, a user device, including any of the first user device 208, the second user device 218, and the third user device 238, may be configured to determine one or more of a first set of parameters and one or more of the second set of parameters for a first desired placement location and a second desired placement location, in order to facilitate placement of a small cell. The user device may be configured to determine any one or more of the first set of parameters in real time (re-determining the one or more of the first set of parameters no less than once per second) or near real-time (re-determining the one or more of the first set of parameters more than once per second but no less than once every five seconds) as the user device is moved through the building 206 to various locations. In one aspect, the user device may be additionally configured to determine any one or more of the second set of parameters in tandem with the measurement and display of any one or more of the first set of parameters. In another aspect, the user device may only determine any one or more of the first set of parameters in real time or near real-time and allow a user to pause the determining of the one or more of the first set of parameters at each of the first and the second approximate location to determine the one or more of the second set of parameters.

In an exemplary aspect, the first set of parameters may comprise any one or more of a signal quality of the signal 204, a signal strength of the signal 204, and a distance and azimuth to the base station 202. In an exemplary aspect, one or more signal quality parameters of the signal 204 are determined by measuring, calculating, or otherwise performing signal analysis by a user device; in other aspects, one or more signal quality parameters of the signal 204 are measured, calculated, or otherwise analyzed by a component external to the user device (e.g., the base station 202, a radio, controller, or other network appliance or node) and relayed to the user device. In one embodiment, referred to herein as a "customer mode," the signal quality displayed on a user interface of the user device is a single signal quality summary, representing one signal quality parameter selected from a group comprising SINR, SNR, Ec/Io, RSRQ, or the like. The signal quality may alternatively be an aggregate signal quality summary representing any one or more signal quality parameters comprising SINR, SNR, Ec/Io, RSRQ, or the like. In customer mode, the user device may be configured to display a signal quality indicator via text (e.g., Very Good, Good, Fair, or Poor) and/or a signal quality visualization (e.g., a speed gauge that changes colors based on the measured signal quality being above or below thresholds associated with tiers, such as Very Good, Good, Fair, or Poor). FIG. 3D displays, in part, a fourth display 330 of a customer mode, comprising a signal quality portion 336, wherein the signal quality portion 336 comprises a signal quality visualization 337 and a signal quality indicator 338. With reference to FIGS. 2 and 3D, when SINR, for example, is determined in the garage 240, the signal quality indicator 338 may be displayed as "Very Good" with an accompanying signal quality visualization 337 indicating the signal quality is Very Good; in contrast, when SINR is determined in the bedroom 230, the signal quality indicator 338 may be displayed as "Fair" with an accompanying signal quality visualization 337 indicating the signal quality is Fair (this may be the result of a weaker signal, higher noise, or some combination of the two).

In an exemplary aspect, when in customer mode, the signal quality indicator 338 and/or the signal quality visualization 337 may singly reflect SINR at the measured location. For example, a signal quality may be Very Good if SINR is measured and/or determined to be greater 12.5 dB, Good if between 10 dB-12.5 dB, Fair if between 7 dB-10 dB, and poor if less than 7 dB. In another aspect, the signal quality indicator 338 and/or the signal quality visualization 337 may be an aggregate of two or more signal quality parameters. For example, a first signal quality parameter may be SINR as described above, and a second signal quality parameter may be RSRQ, wherein RSRQ is Very Good when greater than −9 dB, Good when between −9 dB and −12 dB, Fair when between −12 dB and −14 dB, and Poor when less than −14 dB. In such aspects, each signal quality parameter may be given a numeric score associated with its respective tier, for example, Very Good is given a value of 1, Good is given a value of two, Fair is given a value of three, and Poor is given a value of four. Thus, a location having a Good SINR but Poor RSRQ would have an SINR value of 2 and an RSRQ value of 4. In aspects, the aggregate signal quality parameter may be determined using a mean (3, in the previous example), with the resultant signal quality indicator 338 and signal quality visualization 337 displaying a Fair signal quality. In other aspects, the aggregate signal quality may be weighted according to an algorithm, such as an algorithm taking the general form of:

$$\frac{\alpha(P_1) + \beta(P_{N-1}) \ldots + \gamma(P_N)}{N},$$

where N is the number of signal quality parameters used to calculate the aggregate signal quality parameter, $\alpha$ is a first weight, $P_1$ is a first signal quality parameter, $\beta$ is an $(N-1)^{th}$ weight, $P_{(N-1)}$ is an $(N-1)^{th}$ signal quality parameter, $\gamma$ is an $N^{th}$ weight, and $P_N$ is an $N^{th}$ signal quality parameter. Using the weighted algorithm of this aspect, an $\alpha$ value of 0.9, and a $\beta$ value of 0.6, the aggregate signal quality, and thus the signal quality parameter may equal 2.1, which may be rounded to the nearest integer of 2. Thus, the signal quality parameter would equate to Good, causing the display of a Good signal quality indicator 338 and Good equivalent signal quality visualization 337.

In another embodiment, referred to herein as a "technician mode," the signal quality may be displayed on the user interface of the user device, organized by each measured, selected, and/or available signal quality parameter. That is, there may be a first portion labeled SINR and a second portion labeled RSRQ. In other aspects, there may be a single signal quality menu that may be expanded to display each of the measured, selected, and/or available signal quality parameters. In one aspect, each displayed signal quality parameter may list the actual name of the signal quality parameter and the associated numeric value (e.g., a portion may be labeled SINR and display a measured value of 15 dB). Alternatively, the actual name of each measurement may be displayed and an indicator (similar to the signal quality indicator 338) and/or a visualization (similar to the signal quality visualization 337) may be displayed instead of or in addition to the measured value (e.g., a portion may be labeled SINR and display "Good" or "11 dB—Good").

In exemplary aspects, the first of the parameters may additionally comprise the signal strength of the signal 204. In an exemplary aspect, one or more signal strength parameters of the signal 204 are determined by measuring, calculating, or otherwise performing signal analysis by a user device; in other aspects, one or more signal strength parameters of the signal 204 are measured, calculated, or otherwise analyzed by a component external to the user device (e.g., the base station 202, a radio, controller, or other network appliance or node) and relayed to the user device. In one embodiment, referred to herein as a "customer mode," the signal strength displayed on a user interface of the user device is a single signal strength summary, representing one signal quality parameter selected from a group comprising RSRP, RSSI, or the like. The signal strength may alternatively be an aggregate signal quality summary representing any one or more signal quality parameters comprising RSRP, RSSI, or the like. In customer mode, the user device may be configured to display a signal strength indicator via text (e.g., Very Good, Good, Fair, or Poor) and/or a signal strength visualization (e.g., a speed gauge that changes colors based on the measured signal strength being above or below thresholds associated with tiers, such as Very Good, Good, Fair, or Poor). FIG. 3D displays, in part, the fourth display 330 of a customer mode, comprising a signal strength portion 332, wherein the signal quality portion 332 comprises a signal strength visualization 333 and a signal strength indicator 334. With reference to FIGS. 2 and 3D, when RSRP, for example, is determined in the garage 240, the signal quality indicator 334 may be displayed as "Very Good" with an accompanying signal strength visualization 333 indicating the signal quality is Very Good; in contrast, when SINR is determined in the bathroom 270, the signal strength indicator 334 may be displayed as "Fair" with an accompanying signal quality visualization 333 indicating the signal quality is Fair (this may be the result of the downlink signal being attenuated through many layers of building materials).

In an exemplary aspect, when in customer mode, the signal strength indicator 334 and/or the signal quality visualization 333 may singly reflect RSRP or RSSI at the measured location. As with signal quality, the signal strength displayed to the user may be based on one or more signal strength parameters exceeding or falling below a threshold. For example, the signal strength may be displayed as Very Good if RSRP is measured and/or determined to be greater −90 dBm, Good if between −90 dBm and −105 dBm, Fair if between −106 dBm and −120 dBm, and Poor if below −120 dBm. Similarly, the signal strength may be displayed as Very Good if RSSI is greater than −70 dBm, Good if between −70 dBm and −85 dBm, Fair if between if between −86 dBm and −100 dBm, and poor if less than −100 dBm. In such aspects, each signal quality parameter may be given a numeric score associated with its respective tier in accordance with the rules set forth with respect to signal quality parameters, disclosed herein.

In technician mode, the signal strength may be displayed on the user interface of the user device, organized by each measured, selected, and/or available signal strength parameter. That is, there may be a first portion labeled RSRP and a second portion labeled RSSI (or any other signal strength parameter). In aspects, there may be a single signal quality menu that may be expanded to display each of the measured, selected, and/or available signal quality parameters. Each displayed signal quality parameter may list the actual name of the signal quality parameter and the associated numeric value (e.g., a portion may be labeled RSRP and display a measured value of −82 dBm). Alternatively, the actual name of each measurement may be displayed and an indicator (similar to the signal strength indicator 334) and/or a visualization (similar to the signal quality visualization 333) may be displayed instead of or in addition to the measured value (e.g., the portion may be labeled RSRP and display "Good" or "−95 dBm—Good").

In determining at least one of a first set of parameters, the first set of parameters may comprise a distance and azimuth to a connected base station, such as the base station 202. In one aspect, the distance and azimuth to the connected base station may be displayed on the fourth display 330 of the user interface of the user device. In an exemplary aspect, the cell tower locator portion may comprise a compass 331 and a text potion 332 configured to show the numeric distance to the connected cell tower. In other aspects, this portion of the fourth display 330 may show the distance and azimuth to a connected base station, other land station, mobile station, hot spot, router, or any other type of access point configured to wirelessly communicate with the user device. In aspects, the compass 331 may use cardinal directions and a needle to indicate to the user the relative bearing/azimuth to the connected cell tower with respect to the orientation of the user device. In an exemplary aspect, the text portion may indicate the distance, in miles, to the connected cell tower. In other aspects, different units, such as kilometers, feet, or meters may be used. Though the distance and azimuth may be included as a parameter of the first set of parameters, in other aspects, the distance and azimuth information displayed to the user via the fourth display 330 may not comprise a parameter of the first set of parameters, and may instead be used to guide the user or provide situational awareness of the system environment 200 when testing various candidate small cell placement locations. In a technician mode aspect, the cell tower locator portion of the fourth display 330 may additionally or alternatively comprise the frequency band being used to communicate with the connected cell tower, all frequency bands available at the connected cell tower, a node identifier (e.g., an eNodeB ID), PCI, cascade ID, and the like.

Contemporaneous with or subsequent to determining at least one of the first set of parameters, at least one of the second set of parameters is determined. In an exemplary aspect, the second set of parameters comprises ping, download speed, upload speed, and jitter. The download speed may measure the throughput of the downlink signal to the base station 202 in Mbps. The upload speed may measure the throughput of the uplink signal to the base station 202 in Mbps. Ping may measure the round-trip time, in milliseconds, to reach a host on the telecommunication or other network (e.g., IP network). Jitter may measure the variation in packet latency and displayed in milliseconds. As seen in FIG. 3E, the second set of parameters may be displayed on a fifth display 380 on the user interface of the user device. The download speed may be shown in a download portion 381, the ping may be shown in a ping portion 382, the upload speed may be shown in an upload portion 383, and the jitter may be shown in a jitter portion 384. As seen, the fifth display 380 may additionally comprise IP address information 386 and an identifier 387. Either or both of the IP address information 386 and the identifier 387 may be associated with the location being tested or the host server used to determine the one or more of the second set of parameters.

After determining at least one of the first set of parameters and at least one of the second set of parameters for each of a first approximate location and a second approximate location, a small cell placement location is generated for display on the user interface of the user device. In aspects, if the one or more of the first set of parameters at the first approximate location is better than the one or more of the first set of parameters at the second approximate location, the user device may display, via the user interface, that the first approximate location is the recommended small cell placement location. If the one or more of the first set of parameters at the first approximate location is worse than the one or more of the first set or parameters at the second approximate location, the user device may display, via the user interface, that the second approximate location is the recommended small cell placement location. If the one or more of the first set of parameters at the first approximate location is within 10% of the one or more of the first set of parameters at the second approximate location, display, via the user interface that the recommended small cell placement location is a location selected from the first approximate location and the second approximate location having the greater of the one or more of the second set of parameters. For example, if the first approximate location has a much faster download speed and a marginally slower upload speed than the second approximate location, the first approximate location may be selected. In other aspects, the at least one of the second set of parameters may be assigned a numeric value based on the value exceeding or being below a threshold and averaged or otherwise calculated as described with respect to aspects of the present disclosure.

Figure 3A:
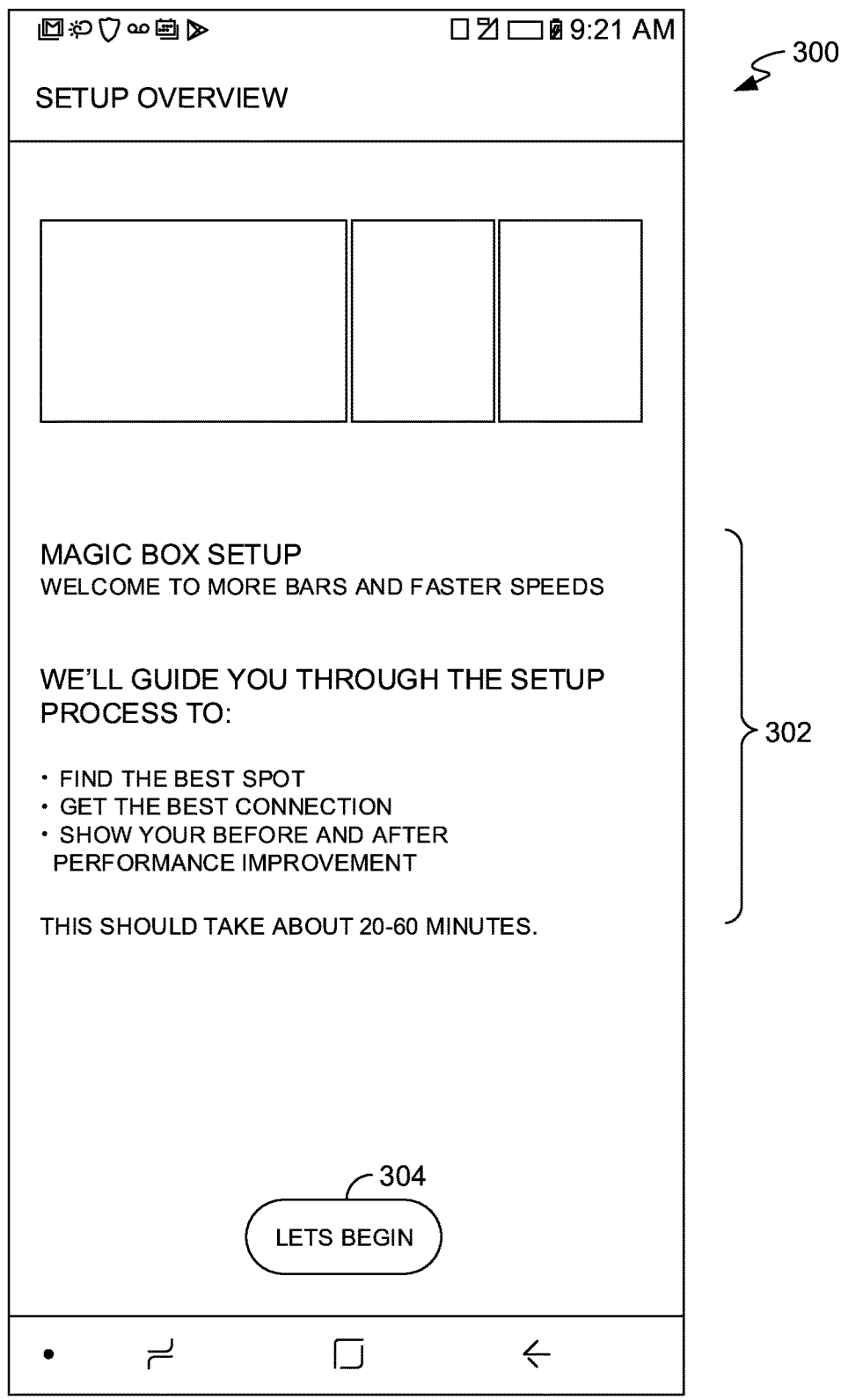
FIGS. 3A-3J depict various representations of a user interface used to facilitate placing a small cell in accordance with aspects herein.
Figure 3B:
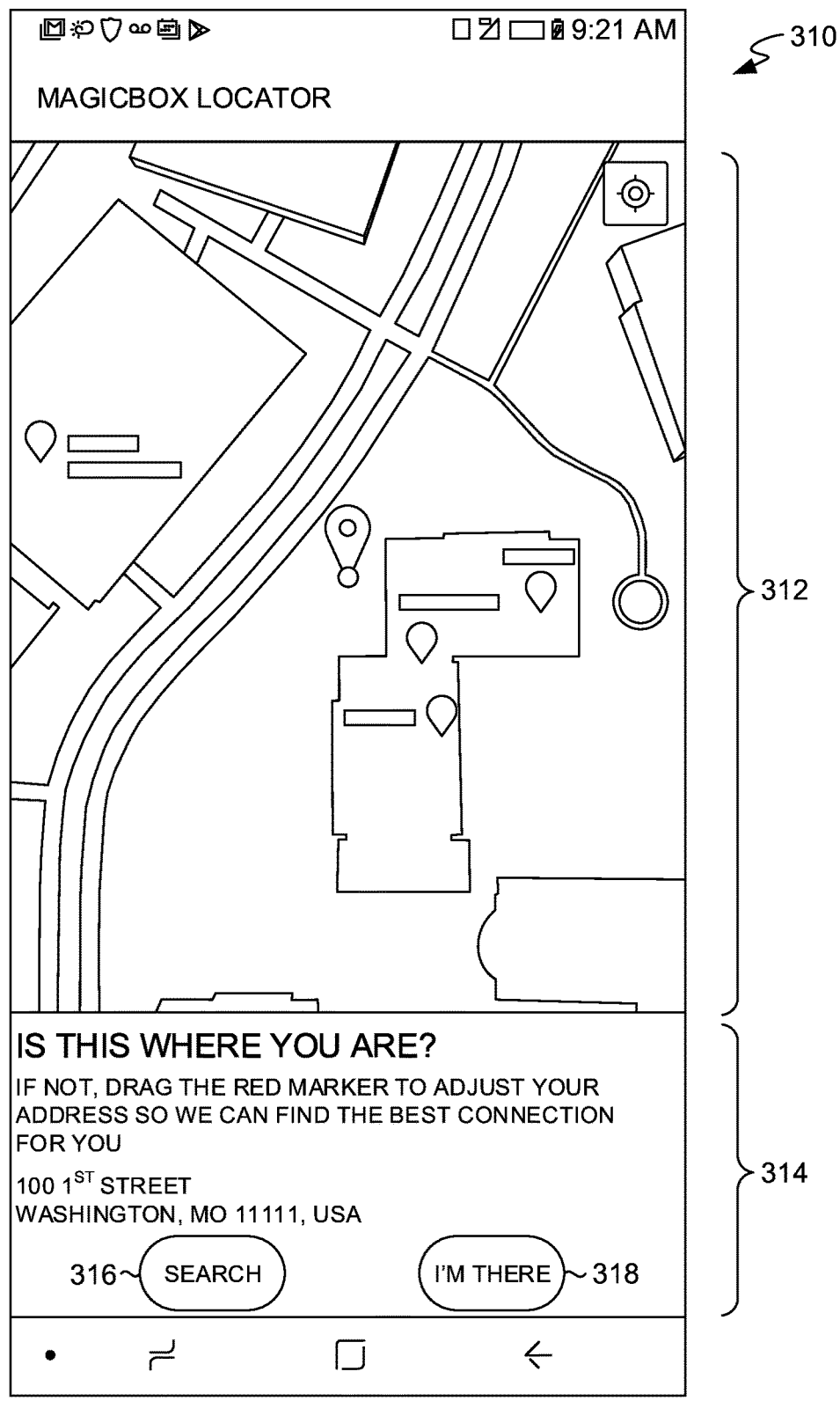
Figure 3C:
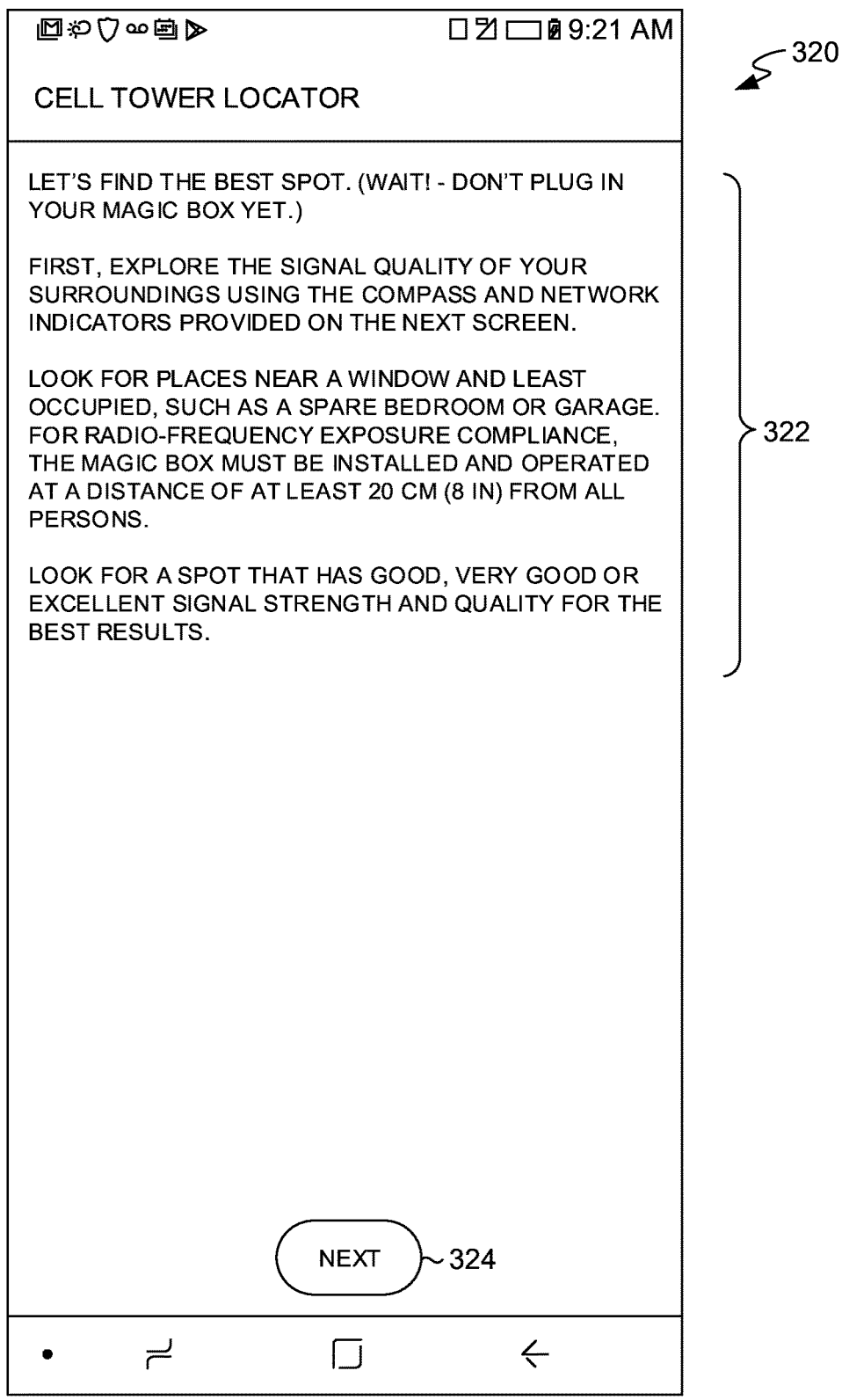
Figure 3D:
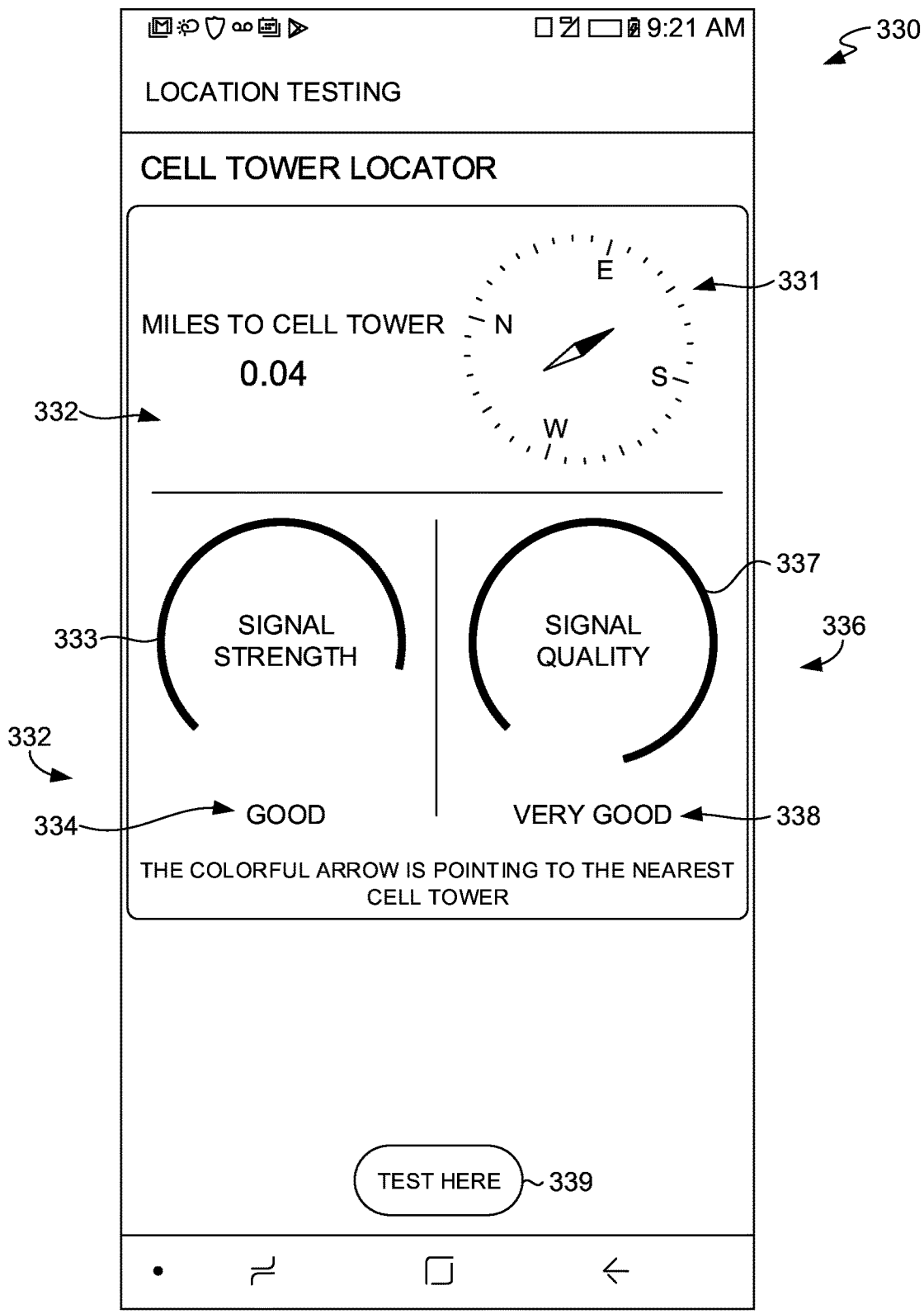
Figure 3E:
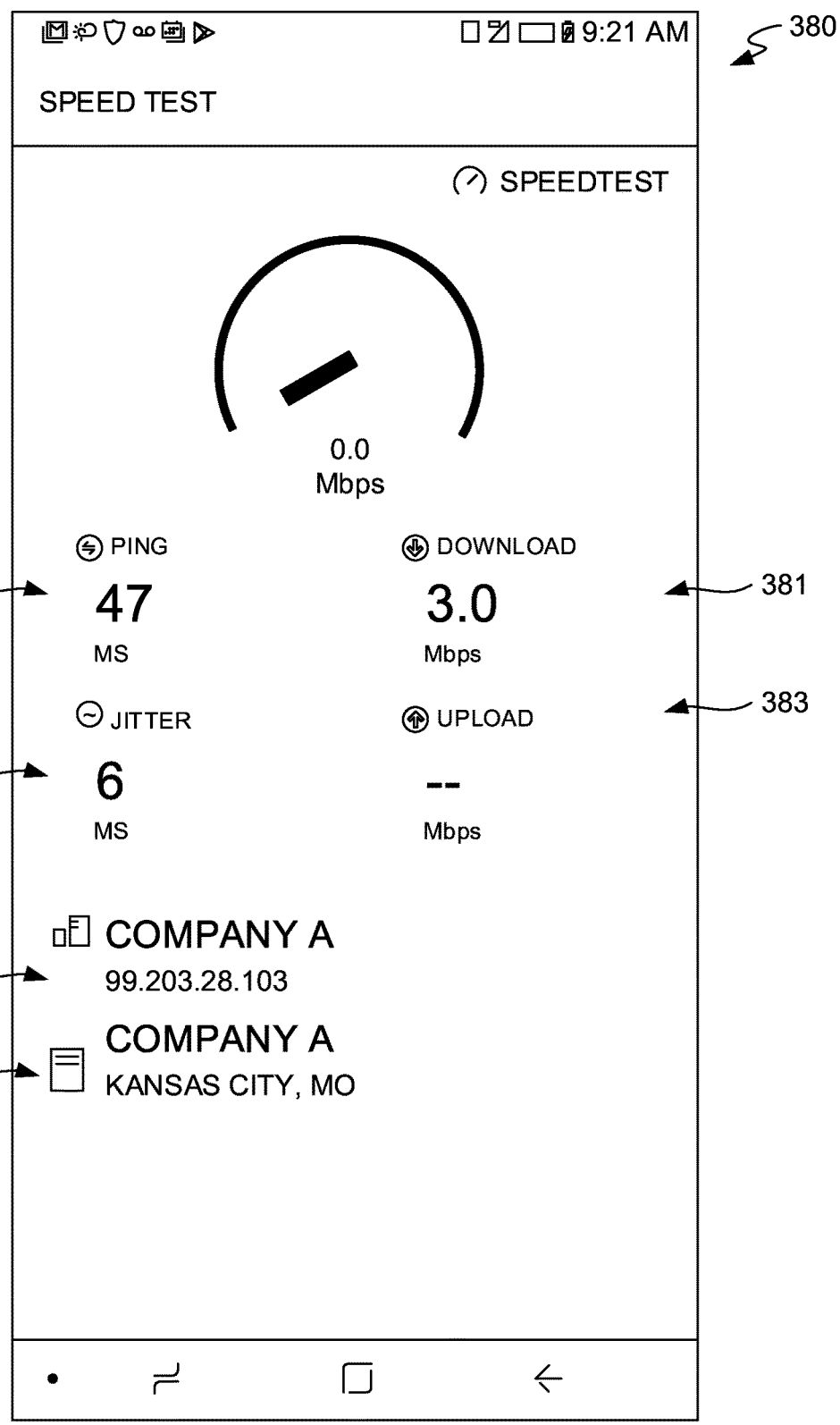
Figure 3F:
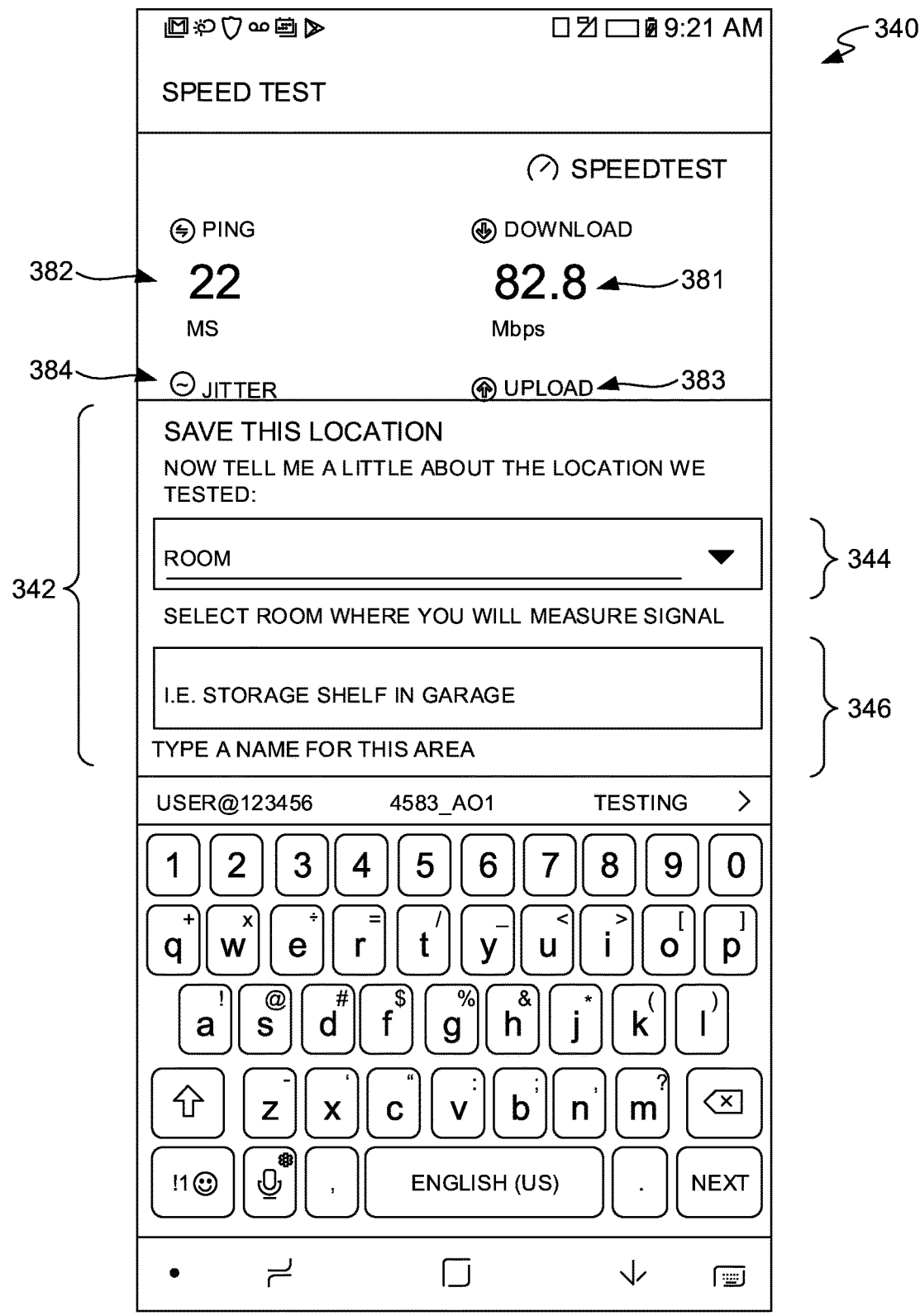
Figure 3G:
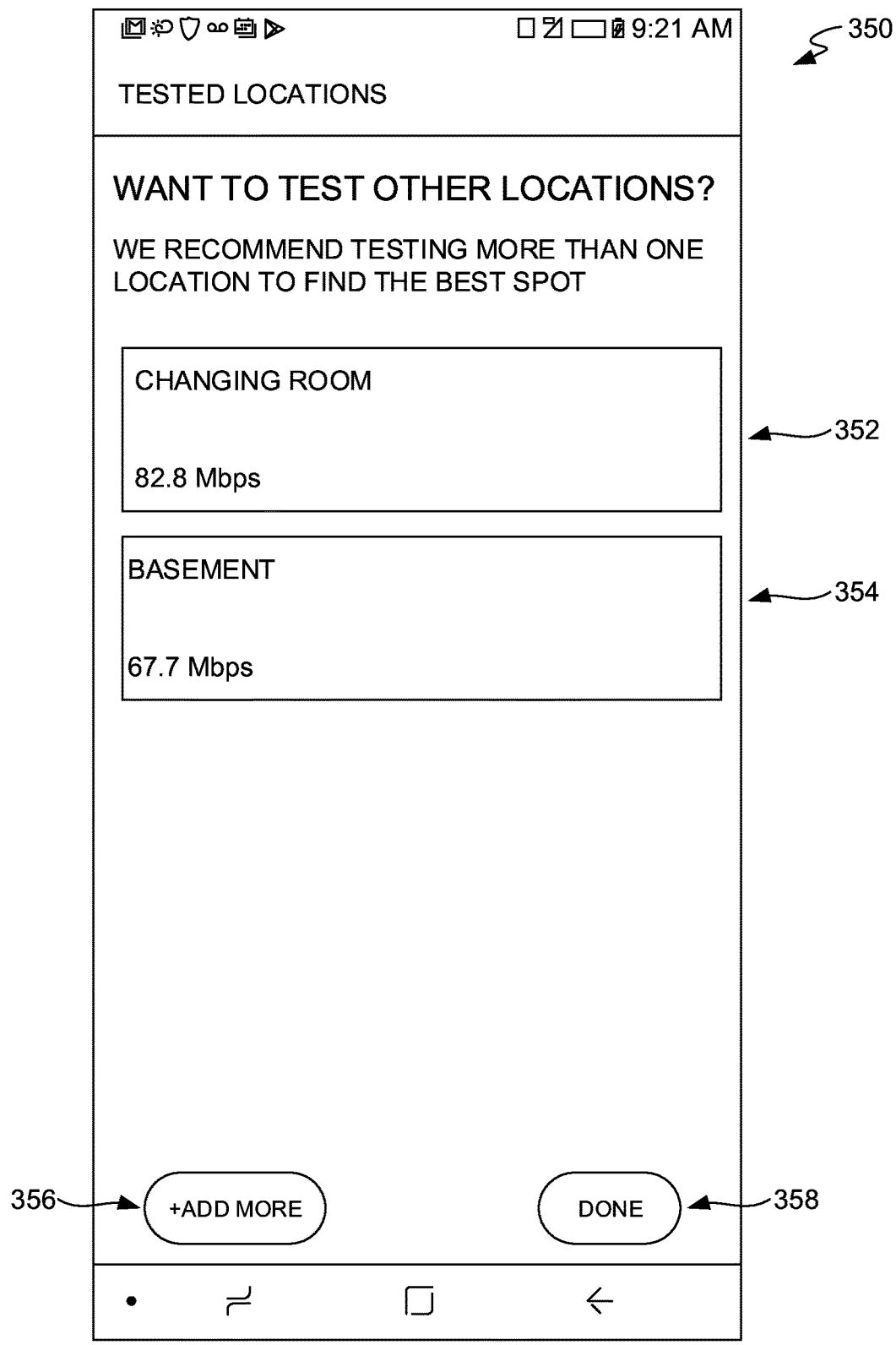
Figure 3H:
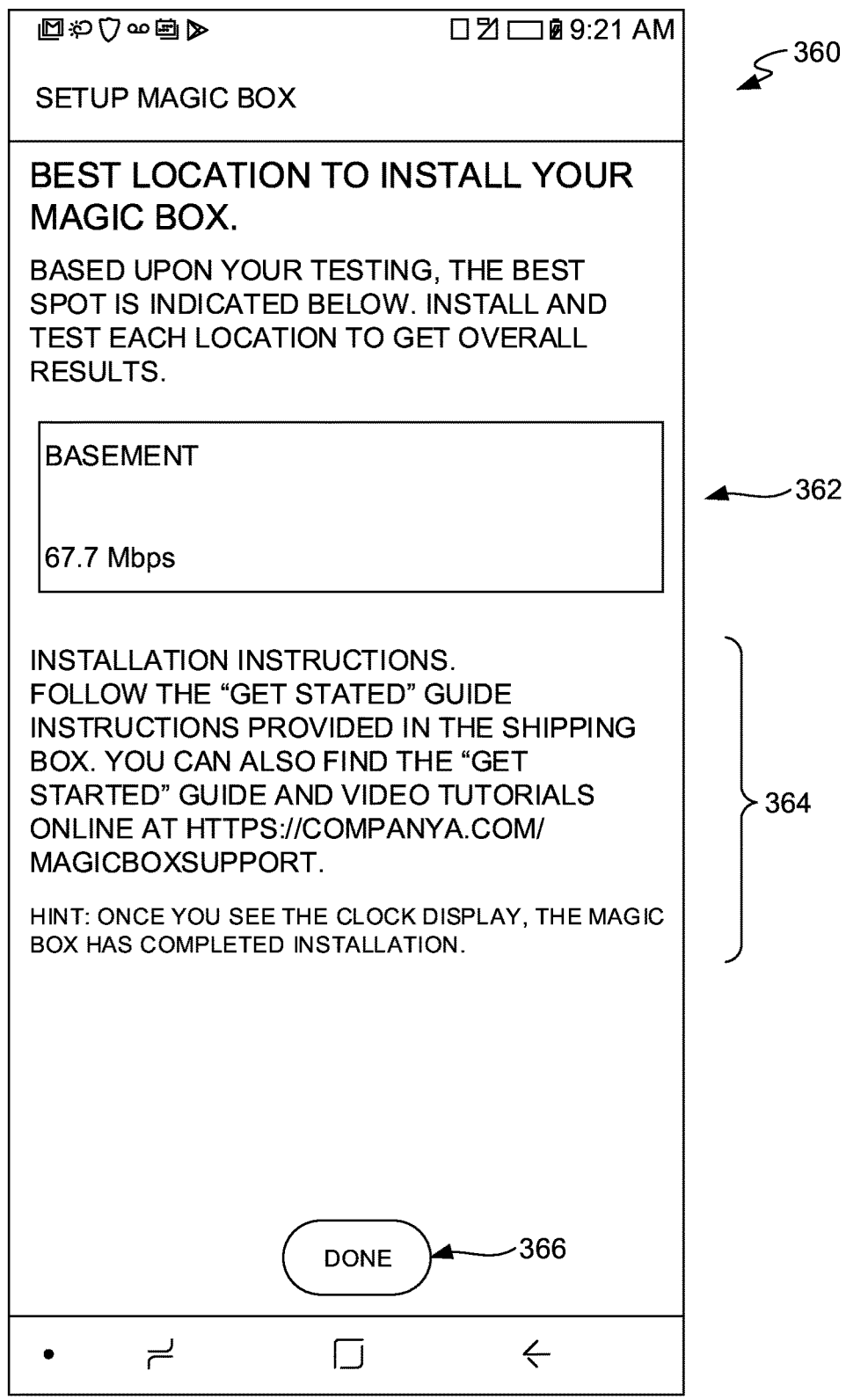
Figure 3I:
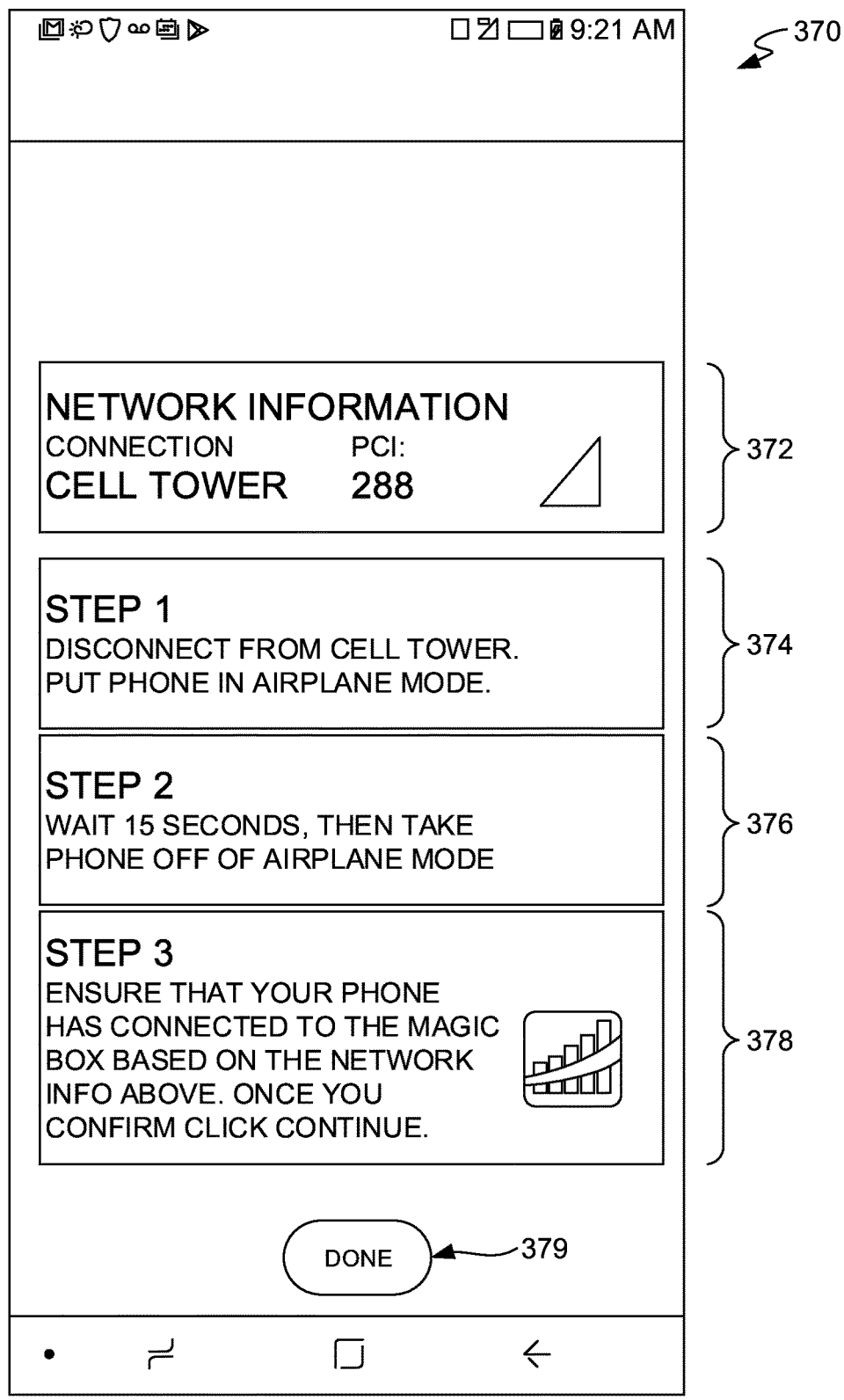

Once the small cell placement location has been determined, it may be displayed to a user on an eighth display 360, as seen in FIG. 3H. The eighth display 360 may have a result portion 362, wherein the location information input by the user associated with the first approximate location or the second approximate location is displayed, as well as at least one parameter of the first and second sets of parameters. For example, as seen in FIG. 3H, the result portion 362 may display the name of the first approximate location and the download speed determined at the first approximate location.

Turning now to FIGS. 3A-3J, various displays on a user interface of a user device are shown that are suitable for performing aspects of the system 200 and a method 400 for facilitating the placement of a small cell. In aspects, the user device may be the second user device 218 of the system 201 in FIG. 2. The various displays of FIGS. 3A-3J are shown as illustrative for the purpose of delimiting the type of information displayed on the size-limited user interface of a user device and how that information is displayed, particularly in the customer view, as described above; departures from the semantics, layout, organization, and the like are within the limits of this disclosure so long as they display the types of information prescribed, consistent with how it is described to be displayed herein.

Beginning at FIG. 3A, a first display 300 is illustrated in accordance with aspects herein for display on the user interface of a user device. The first display 300 comprises an introduction portion 302 and a start button 304. The introduction portion 302 provides basic information to the user managing their expectations of the placement selection process and time required. The start button 304 allows the user to proceed to a subsequent screen. FIG. 3B illustrates a second display 310 in accordance with aspects herein for display on the user interface of the user device. The second display 310 comprises a map portion 312, a text portion 314, a search button 316, and a proceed button 318. The map portion 312 may show a detected location of the user device, the detected location based on GPS, proximity to a Wi-Fi router having a known location, or using triangulation or other geo-locating means with respect to a land or mobile station. In aspects, the map portion 312 may be manipulated by user in order to move a cursor from the detected location to a location approximating the location of the user. The text portion 314 may provide instructions to user on how to manipulate the map portion 312, and may, in some aspects, display an approximate address of the cursor location from the map portion 312. The text portion 314 may also comprise the search button 316, which may allow the user to manually enter in an address, point of interest, landmark, or the like, in order to approximate the user's location. Finally, the text portion 314 may comprise a proceed button 318, which, when selected, allows the user to proceed to a subsequent screen.

Turning now to FIG. 3C, a third display 320 is illustrated in accordance with aspects herein for display in the user interface of the user device. The third display 320 comprises detailed instructions 322 and the next button 324. The detailed instructions 322 direct the user to use displayed distance and azimuth information, such as that provided by the compass 331 and text portion 332, as seen in FIG. 3D, in order to explore the user's surroundings. The detailed instructions 322 males provide general placement advice, such as focusing on locations near windows, unoccupied locations, and locations that have Good or better signal quality and signal strength. Next button 324, when selected, allows the user proceed to a subsequent screen. In addition to comprising the cell tower locator portion, the signal quality portion 336, and the signal strength portion 332 as previously discussed, the fourth display 330 may comprise a test button 339. In aspects where the at least one of a first set of parameters is determined at a different time than the at least one of a second set of parameters, the test button 339 may pause the determining of the at least one of the first set of parameters at a candidate placement location and determine the at least one of the second set of parameters at said candidate placement location.

Continuing to FIG. 3F, after determining the one or more of the second set of parameters, a sixth display 340 may be displayed on the user interface of the user device. The sixth display 360 comprises the download portion 381, ping portion 382, upload portion 383, and jitter portion 384 of the fifth display 380. The sixth display may also comprise a location save location portion 342 that allows provides instructions to the user and allows the user to specify a location associated with the candidate location at which each of the at least one of the first set of parameters and the second set of parameters were determined. The save location portion 342 may comprise a coarse location portion 344 and a fine location portion 346, wherein the coarse location portion 344 permits the user to enter coarse location information (e.g., a room, building, floor, or other identifier having less specificity than a fine location), and the fine location portion 346 permits the user to enter fine location information (e.g., area, object, office, or other identifier having greater spatial specificity than the coarse location. In other aspects, only one location portion may be displayed and the user may have discretion as to what information to place in the location portion that may be sufficiently descriptive. Once the at least one of the first set of parameters have been determined, as displayed on the fourth display 330, the at least one of the second set of parameters have been determined, as displayed on the fifth display 380, and at least one of each of the first set of parameters and the second set of parameters has been associated with a location on the sixth display 340, a seventh display 350, seen in FIG. 3G, lists all tested locations. The sixth display 350 comprises a first approximate location portion 352, a second approximate location portion 354, an add location button 356 and a done button 358, wherein the first approximate location portion 352 reflects the determined parameters and the location name of the first approximate location and the second approximate location portion 354 reflects the determined parameters and the location name of the second approximate location. Though only a first and second approximate location are shown in FIG. 3G, the add location button 356 may be selected by the user to determine at least one of a first set of parameters and at least one of a second set of parameters at a third or subsequent location. Once the user has tested the desired number of locations, the done button 358 may be selected to proceed to a subsequent screen. As previously discussed, FIG. 3H illustrates the eighth display 360, used to inform the user of the results of the placement process. In addition to comprising the result portion 362, the eighth display may comprise installation instructions 364, that may direct the user to refer to printed or online installation instructions, and a done button 366 to proceed to a subsequent screen.

Continuing to FIG. 3H, a ninth display 370 is illustrated in accordance with aspects herein for display in the user interface of the user device. The ninth display 370 may comprise step by step instructions to the user that ensures the user device may successfully attach to the small cell instead of the base station to which it was previously connected (and testing). The ninth display 370 may comprise a network information portion 372, a first step 374, a second step 376, a third step 378 (more or fewer steps may be used), and a done button 379 to proceed to a subsequent screen. The network information portion 372 displays what the user device is presently connected to, and may include information about the back haul connection (e.g., the PCI of the base station). Once the user device has successfully completed the small cell connection protocol, the network information portion 372 should change from displaying the base station to displaying the small cell. The first step 374 may instruct the user to disconnect from the base station by placing the device in airplane mode, turning off mobile data, restarting the user device, turning off the user device, or otherwise breaking the communication session between the user device and the base station. The second step 376 may instruct the user to wait a certain amount of time (e.g., 15 seconds) before attempting to reestablish a wireless data connection. The third step 378 may be a validation step, wherein the user is instructed to confirm that the user device is connected to the small cell instead of the base station, for example by evaluating the network information portion 372.

Figure 3J:
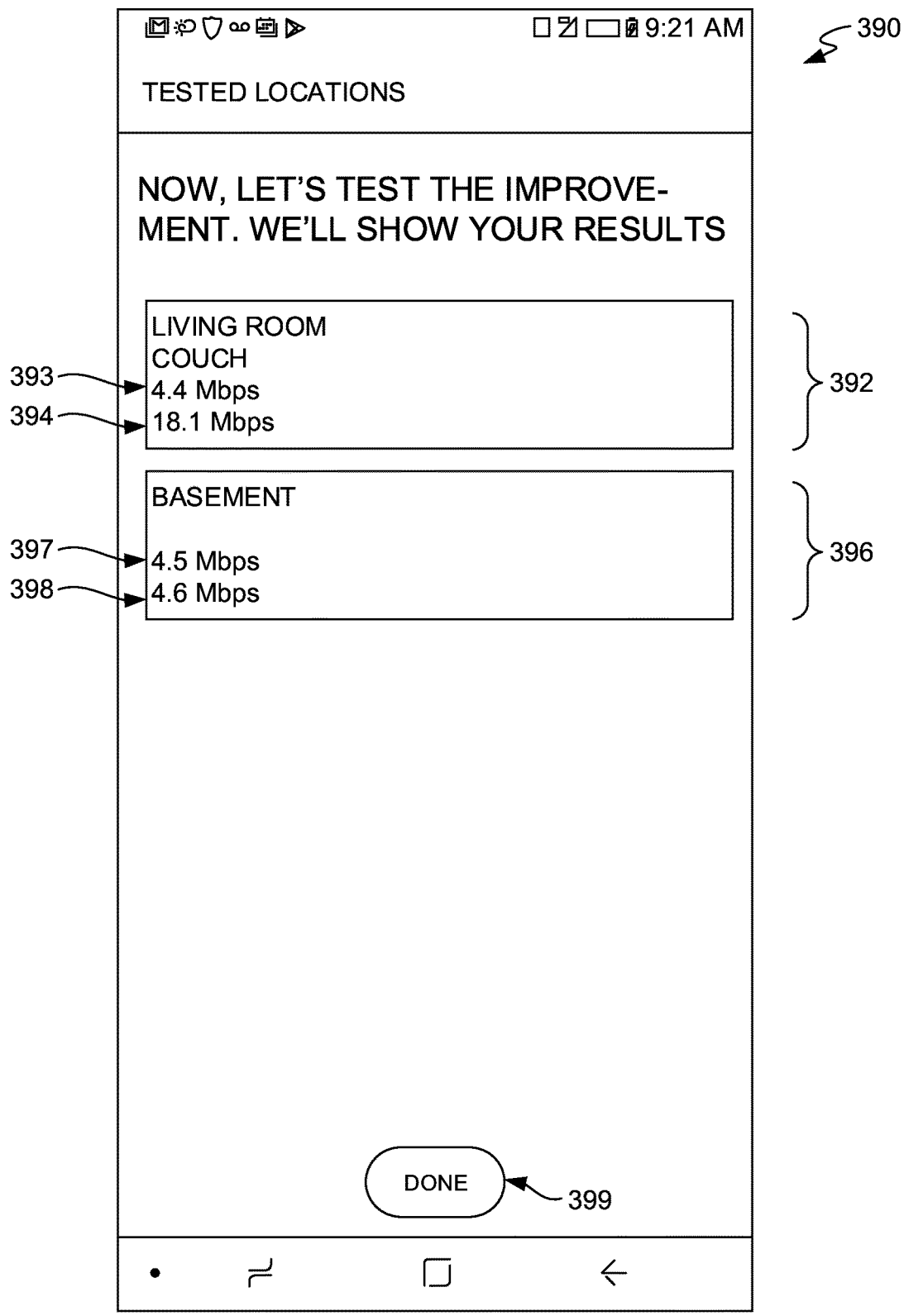

In FIG. 3J, a tenth display 390 is illustrated in accordance with aspects herein for display on the user interface of the user device. The tenth display 390 may comprise a first approximate location portion 392, a second approximate location portion 396, and a done button 399, wherein the first approximate location portion 392 comprises a first preplacement parameter 393 and a first post placement parameter 394, and the second approximate location portion 396 comprises a second preplacement parameter 397 and a second post placement parameter 398. The first approximate location portion 392 may comprise the name of the first approximate location and each of the first preplacement parameter 393 and first post placement parameter 394 may display to the user a parameter, such as download speed, at the first approximate location before connecting to the small cell and after connecting to the small cell. The second approximate location portion 396 may comprise the name of the second approximate location and each of the second preplacement parameter 397 and the second post placement parameter 398 may display to the user the parameter shown in the first approximate location portion 392, but with respect to the second approximate location, before and after connecting to the small cell. The done button 399 may permit the user to proceed to a subsequent screen, in other aspects a re-test button may permit a user to repeat the entire process.

Figure 4:
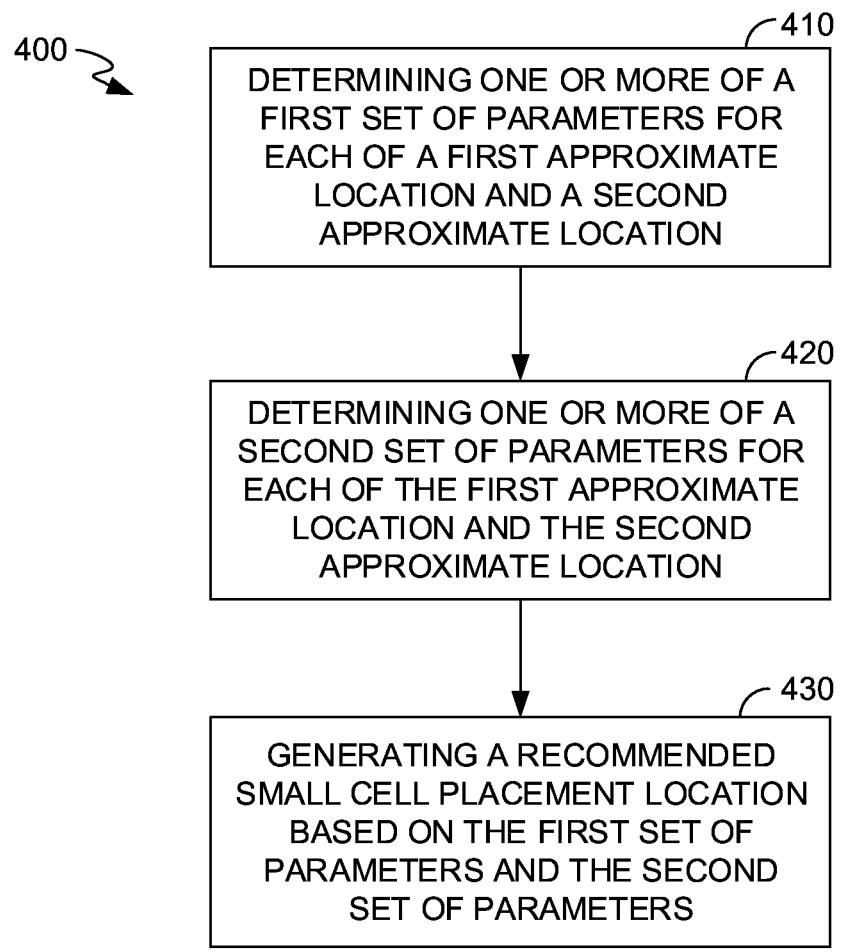
FIG. 4 depicts a flow diagram of an exemplary method for determining placement of a small cell, in accordance with aspects herein.

FIG. 4 depicts a flow diagram of an exemplary method 400 for facilitating the placement of a small cell, in accordance with aspects of the present disclosure. Initially at block 410, one or more of a first set of parameters for each of the first approximate location and a second approximate location is determined. The first set of parameters may comprise at least one of a signal quality of a downlink signal provided by a first base station, a signal strength of a downlink signal provided by the first base station, and a distance and azimuth to the first base station. In aspects, the signal quality may comprise RSRQ, SINR, and/or SNR, the signal strength may comprise RSRP and/or RSSI, and the distance and azimuth may be determined in miles and a relative bearing in degrees. In aspects, the determining of the one or more of the first set of parameters may be done by a UE executing a program or application stored on a non-transitory computer readable media.

At block 420, one or more of a second set of parameters for each of the first approximate location and the second approximate location is determined. The second set of parameters may comprise at least one of a download speed, and upload speed, ping, and jitter. In aspects, the download speed and upload speed may be measured in Mbps and the ping and jitter measured in milliseconds. In aspects, the determining of the one or more of the second set of parameters may be done by the UE executing the program or application stored on the non-transitory computer readable media.

At block 430, a recommended small cell placement location is generated for based on at least one parameter of the first of parameters and at least one parameter of the second set of parameters. In aspects, the recommended small cell placement location may be displayed on a user interface of the UE executing the program or application stored on the non-transitory computer readable media. In aspects, subsequent to block 430, the method 400 may further comprise placing the small cell at the recommended small cell placement location, executing a connection protocol, and connecting the UE to the small cell, wherein the connection protocol comprises disconnecting the UE from the base station by turning off the wireless connection with the base station (e.g., placing the UE in airplane mode, powering the UE off, or restarting the UE), waiting a certain amount of time, and turning on the wireless connection.

Figure 5:
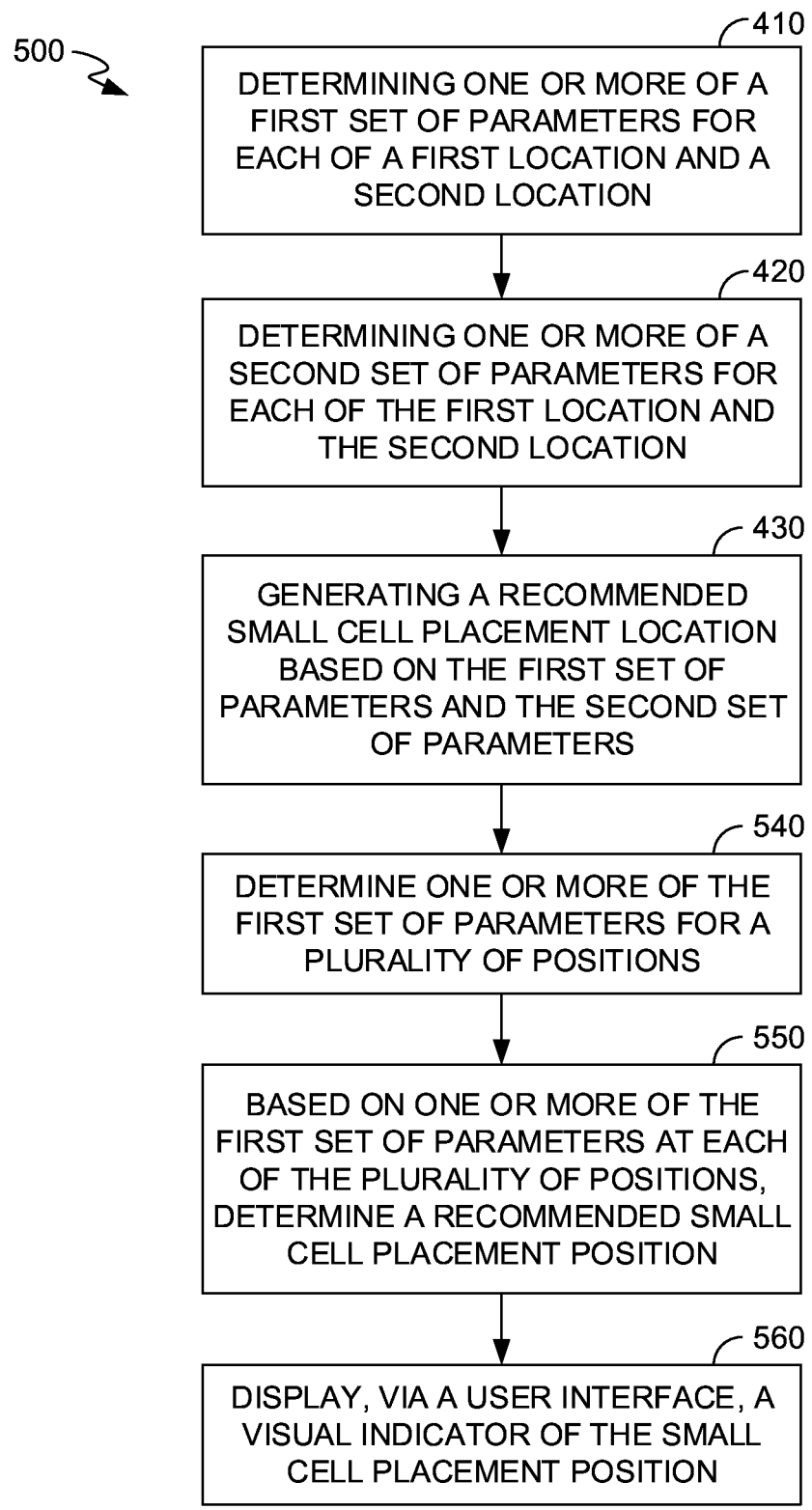
FIG. 5 depicts a flow diagram of an exemplary method for displaying a visual indicator for placement of a small cell, in accordance with aspects herein.

Turning now to FIG. 5, a flow diagram of an exemplary method 500 for facilitating the placement of a small cell is provided in accordance with aspects of the present disclosure. Using the operations of blocks 410, 420, and 430, it may be determined that a first approximate location is preferable to a second approximate location for placement of a small cell. For example, the first approximate location may be associated with a room, such as the kitchen 220 of FIG. 2 and the second approximate location may be associated with a second room, such as the bedroom 230. While a UE located within the building 206 will benefit from placement of the small cell in the kitchen 220 (the first approximate location), it may be desirable to further optimize the placement of the small cell. Accordingly, method 500 provides a method for determining a preferred position of the small cell, wherein the preferred position of the small cell is located within an area associated with the first approximate location. As used with respect to embodiments related to the use of augmented reality discussed herein, the term "position" is used to define a combined location and orientation, wherein the "location" is a point in space and the "orientation" is how a device is arranged at the point in space. The location may be descriptive (e.g., in the western-most part of the northern-most window sill) or absolute (e.g., geocoordinates, such as 37.78N, 122.25W). The position may be descriptive (e.g., tilted up and to the right, when looking out a window) or absolute (e.g., having an azimuth of X degrees and an altitude of Y degrees). In other words, a device placed at a single location may have numerous possible orientations, each unique combination comprising a unique position.

In aspects, once the operations of blocks 410, 420, and 430 have identified the first approximate location as the best of the tested approximate locations, the method 500 proceeds to block 540. At block 540, one or more of a first set of parameters are determined at each of a plurality of positions using a device capable of wirelessly communicating with one or more macro sites (e.g., the UE). Each position may be said to be within an area associated within the recommended small cell placement approximate location. For example, the recommended small cell placement location may be the first approximate location, wherein the first approximate location is associated with the kitchen 220 of FIG. 2. Accordingly, several positions within the kitchen 220 may be tested to further optimize the placement of the small cell. For example, a first location may be on a kitchen counter by a sink, a second location may be on a kitchen island, and a third location may be in the kitchen window sill. At each location, multiple orientations may be tested, for example, by altering the yaw (alpha), pitch (beta), and/or roll (gamma) of the device used to perform the test. Accordingly, a first position may comprise the first location and a first orientation, a second position may comprise the first location and a second orientation, a third position may comprise a second location and the first orientation, and a fourth position may comprise a third location and a third orientation. The precise orientation of the measuring device (e.g., the UE) may be determined using any one or more position sensors communicatively coupled to the device's processor. Such position sensors may include an accelerometer, gyroscope, satellite location sensor (e.g., GPS, GLONASS, BeiDou Navigation Satellite System (BDS), Galileo, and the like), magnetometer, and barometer.

Any one or more of the first set of parameters may be tested at each of the plurality of tested positions. For example, in aspects, the first set of parameters may be any combination of one or more of a signal strength and a signal quality, as disclosed herein. Once determined, the one or more of the first set of parameters may be stored and associated with a particular position. In addition to the orientation being determined by the position sensors, the position sensors may also be used to provide inertial location services. Using any one or more observer techniques, the measuring device may determine the location of a particular position based on the relative movement from the testing location to an observation point.

Once one or more of the first set of parameters have been determined for each of the plurality of tested positions, a recommended small cell placement position is determined in block 550. At a high level, the recommended small cell placement position is based on a comparison between the values associated with one or more of the first set of parameters to determine which values are preferred, the recommended small cell placement position being associated with the position having the preferred value(s). Whether a value is preferred may be based, in aspects, on any one or more signal quality or signal strength characteristics. In aspects, the preferred value associated with one or more of the first set of parameters may be based on a first position having a better (i.e., stronger) observed signal strength for a first downlink signal to a first macro site than a second position. Alternatively, the observed signal strength for the first downlink signal to the first macro site may be better (i.e., stronger) than an observed signal strength for a second downlink signal to a second macro site. In other aspects, the preferred value associated with one or more of the first set of parameters may be based on a first position having a better signal quality (e.g., greater SINR, lower RSSI, greater RSRQ, greater EC/Io, etc.) than a second position. In yet other aspects, a combination of signal strength and signal quality may be compared to determine the recommended small cell placement position. For example, a score may be associated with a tiered degree of each of the signal strength and signal quality (e.g., excellent=4, good=3, fair=2, poor=1) and added. In other aspects, a weighted score may be calculated by applying a first weighting factor to a signal strength score and a second weighting factor to a signal quality score. That is, a signal strength may be weighted as 0.5 and a signal quality may be weighted as 1. Regardless of the particular methodology used, a recommended small cell placement position may be determined, as selected from the plurality of tested positions.

Once the recommended small cell placement position is determined, the results are displayed in block 560. In one aspect, a visual indicator may be displayed as superimposed on an image captured by a visual input device communicatively coupled to the UE (e.g., a camera) in the recommended small cell placement position. The visual indicator may be a representation of the small cell, a representation of the UE, or a generic visual indicator (e.g., a green circle). The visual indicator may be in the location associated with the first position and oriented according to the orientation associated with the first position. That is, if the first position is on the western-most portion of a window sill and oriented with no pitch, no roll, and 45 degree yaw, the visual indicator may be seen on the user interface as superimposed on a real-time (within one second) representation of an image captured by the visual input device (superimposed on the window sill, at the appropriate angle). In other aspects, the user interface may simply display guidance directions (e.g., move 5 feet forward, and yaw the device 45 degrees).

Figure 6A:
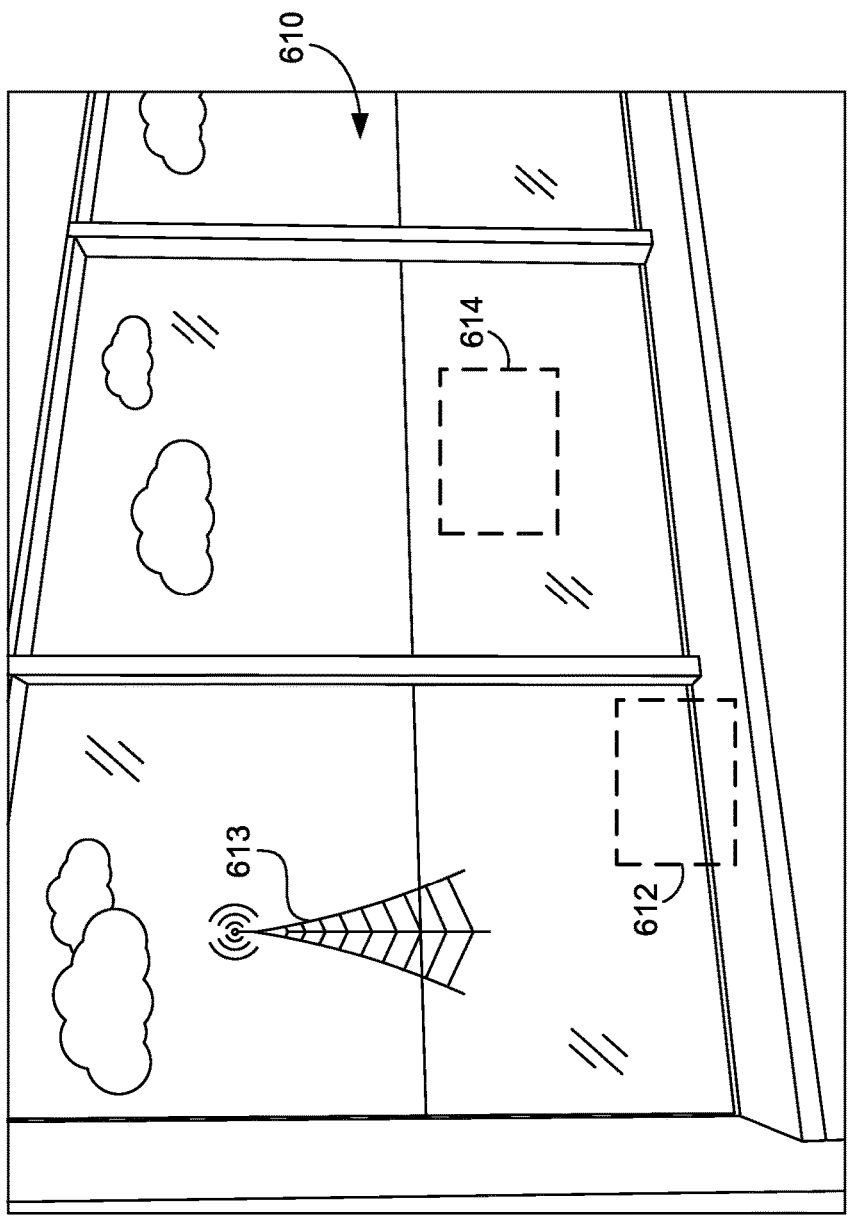
Figure 6B:
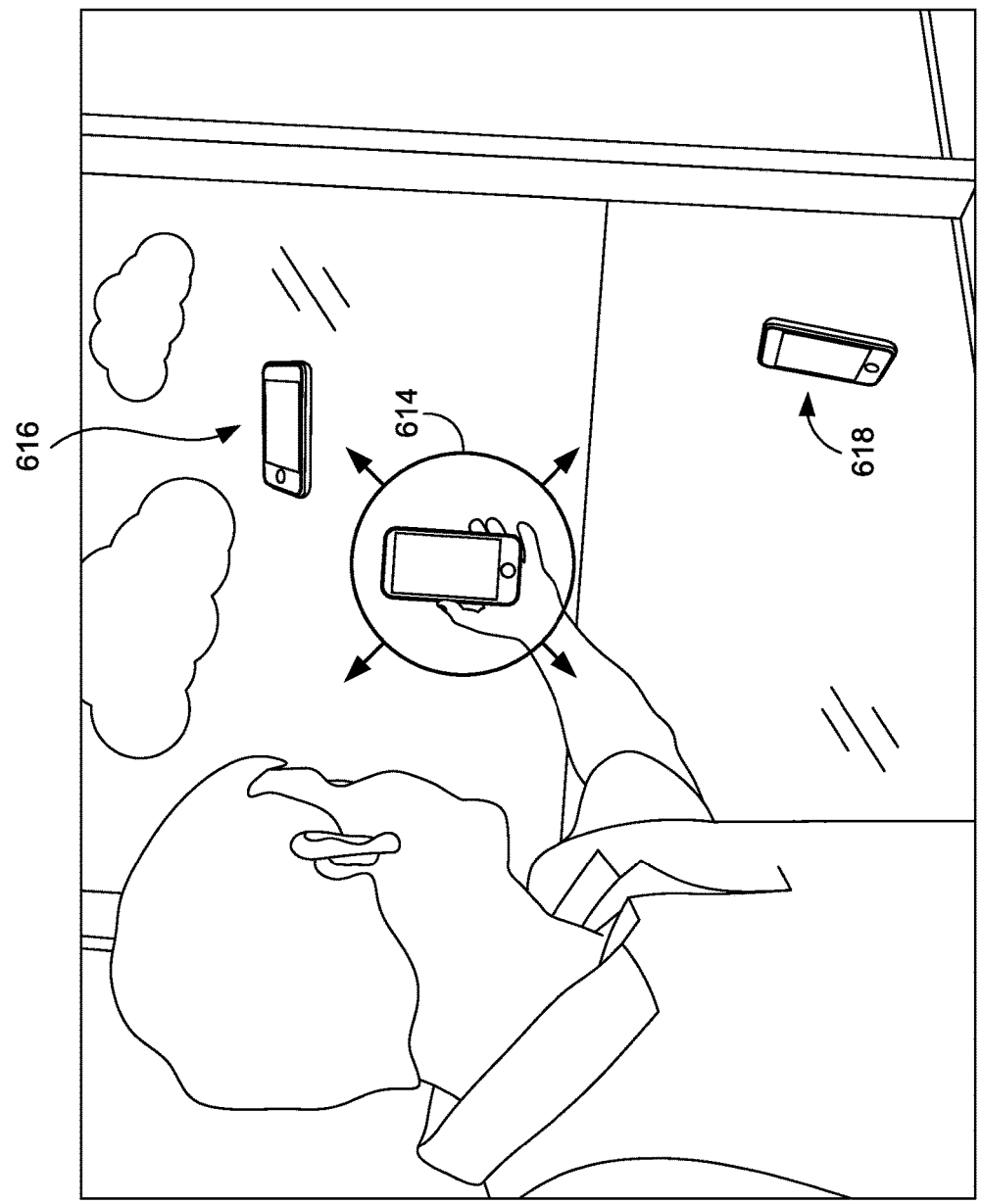

Turning now to FIGS. 6A-6C, a series of illustrations in accordance with aspects herein are depicted. FIG. 6A includes a scene 600 that may be associated with a recommended small cell placement location, such as a conference room 610, wherein the recommended small cell placement location is based on one or more of a first set of parameters of a first downlink signal from a first macro site 613. Within the area associated with the recommended small cell placement location (conference room), a first location 614 and a second location 612 may at least partially comprise a plurality of testing positions. FIG. 6B shows that within or in proximity to the first location 614, a measuring device, such as a UE 622, may be manipulated in space to a first position 616 and a second position 618, wherein each of the first position 616 and the second position 618 comprises a location and orientation. For example, the first position 616 may be said to have an orientation comprising zero pitch, zero roll, and 90 degrees yaw, and the second position 618 may be said to have an orientation comprising −45 degrees pitch, zero roll, and 45 degrees yaw. While in each of the first position 616 and the second position 618, one or more of the first set of parameters may be determined, and, in some aspects, may be displayed in real time on the user interface of the UE in order to help guide the user's manipulation of the UE in space to find the best parameters. Once the one or more of the first set of parameters have been determined and compared, a recommended small cell placement position is calculated, wherein the recommended small cell placement comprises a location and orientation.

As seen in FIG. 6C, the UE 622 may use augmented reality in order to facilitate the placement of the small cell. In the illustrated example, the recommended small cell placement position may be determined to be position 620. Using the UE, the visual input device may capture a representation of the scene 600 and the UE may subsequently render the representation of the scene 600 in real time on the UE's user interface. Superimposed on the representation of the scene 600, a visual indicator 624 indicates the recommended small cell placement position. As seen in FIG. 6C, the recommended small cell placement position may have a location associated with a window sill and have zero pitch, zero roll, and zero yaw. In aspects such as the one illustrated in FIG. 6C, the visual indicator 624 may be a representation of a small cell; however, in other aspects, the visual indicator 624 may be a representation of a UE, or may be a generic visual indicator, such as a colored shape (e.g., a green circle, yellow block, and the like).

In other aspects of the present disclosure, the recommended small cell placement position may be determined without first determining a recommended small cell placement location, that is, with reference to FIG. 5, aspects of the present disclosure may skip blocks 410, 420, and 430 and proceed directly to block 540. This may be useful for circumstances where there is insufficient time to perform the entirety of method 500, restricted access to alternative approximate locations, or known information about relative backhaul connectivity. In such cases, one or more of the first set of parameters may be determined at a plurality of testing positions, a recommended small cell placement position may be determined from the plurality of testing positions, and a visual indicator may be displayed as superimposed on a capture image, as disclosed herein.

In yet other aspects of the present disclosure, the recommended small cell placement position may be used for purposes other than facilitating the placement of a small cell. For example, any one or more methodologies of the present disclosure may be used or combined to determine a hotspot, wherein the hotspot is a position that has been determined to have the best one or more of the first set of parameters. In other words, if a user of a UE wished to find the best position in their home for connectivity to a macro site, they could use the methods and systems of the present disclosure to find said best position. This is because the recommended small cell placement location and the recommended small cell placement position may be based on one or more of an optimum signal strength and signal quality, features which would improve the quality of a connection between a UE and a macro site. Similar to the placement of a small cell, augmented reality may be used to provide a visual indicator superimposed on a visual representation of an environment to guide the user to the hotspot. In such an aspect, the visual indicator may be a representation of the UE, a person holding the UE, or a generic visual indicator as disclosed herein.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A system for visually identifying a preferred location for communicating with a wireless telecommunication network, the system comprising:
 a first macro site;
 a user equipment (UE), the UE comprising one or more antennas for receiving a downlink signal from the first macro site and to communicate an uplink signal to the first macro site, a camera, a user interface, and a processor, the processor configured to:
 determine, using the one or more antennas, a first set of parameters associated with the downlink signal for each of a first position of the UE and a second position of the UE, the first set of parameters representing at least one of a signal quality and a signal strength associated with the downlink signal;
 determine the first set of parameters for each of a first approximate location and a second approximate location;
 display, on the user interface, the first set of parameters in real time;
 determine a second set of parameters for each of the first approximate location and the second approximate location, the second set of parameters comprising at least one of a downlink speed of the downlink signal and an uplink speed of the uplink signal;
 determine, based on a comparison of the first set of parameters associated with the first position of the UE and the first set of parameters associated with the second position of the UE, that the first position of the UE is a preferred position for wireless communication with the first macro site;
 generate a recommended approximate small cell placement location for display on the user interface based on at least one parameter of the first set of parameters and at least one parameter of the second set of parameters, wherein each of the first position and the second position are located within an area associated with the approximate small cell placement location;
 display, on the user interface, an image obtained from the camera in real time, the image representing at least a portion of an environment comprising the first position and the second position; and
 display a visual indication on the user interface of the preferred position, the visual indication being superimposed on the image.

2. The system of claim 1, wherein the UE further comprises one or more sensors comprising an accelerometer, gyroscope, magnetometer, barometer, and a satellite location sensor.

3. The system of claim 2, wherein the first position comprises a first location and a first orientation and the second position comprises a second location and a second orientation, at least one of the second location and the second orientation being different than the first location and the first orientation.

4. The system of claim 3, wherein each of the first position and the second position are determined based on, at least in part, information obtained from the one or more sensors.

5. The system of claim 1, wherein the visual indication is a representation of a small cell.

6. The system of claim 1, wherein the first set of parameters is refreshed at least once per second and displayed in real time on the user interface.

7. The system of claim 1, wherein the system further comprises:
 a second macro site,
 wherein the one or more antennas receives a downlink signal from the second macro site and transmits the uplink signal to the second macro site, and wherein the processor is additionally configured to:
 determine a first set of parameters associated with the downlink signal from the first macro site for a third position of the UE;

determine a first set of parameters associated with the downlink signal from the second macro site for the third position; and determine, based on a comparison of the first sets of parameters associated with the third position of the UE and the first set of parameters associated with the first position of the UE, that the first position of the UE is the preferred position for wireless communication.

8. A method for facilitating placement of a small cell, the method comprising:

determining, using one or more antennas of a user equipment (UE) for receiving a downlink signal from a first macro site, a first set of parameters associated with the downlink signal from the first macro site for a first position of the UE and a first set of parameters associated with the downlink signal from the first macro site for a second position of the UE, each of the first sets of parameters representing at least one of a signal quality and a signal strength associated with the downlink signal;

display, on a user interface of the UE, the first set of parameters in real time;

determine, based on a comparison of the first set of parameters associated with the first position of the UE and the first set of parameters associated with the second position of the UE, that the first position is a preferred position for wireless communication with the first macro site, wherein the preferred position is further determined by determining the greater of a first position score and a second position score, each of the first position score and the second position score being a sum of a signal strength rating and a signal quality rating, the signal strength rating being based on the signal strength indicator exceeding a predetermined threshold and the signal quality rating being based on the signal quality indicator exceeding a predetermined threshold;

display, on a user interface of the UE, an image obtained from a camera in real time, wherein the camera is communicatively coupled to the UE, the image representing at least a portion of an environment comprising the first position and the second position; and display a visual indication on the user interface of the preferred position, the visual indication being superimposed on the image.

9. The method of claim 8, wherein the UE further comprises one or more sensors comprising an accelerometer, gyroscope, magnetometer, barometer, and a satellite location sensor.

10. The method of claim 9, wherein the first position comprises a first location and a first orientation and the second position comprises a second location and a second orientation, at least one of the second location and the second orientation being different than the first approximate location and the first orientation.

11. The method of claim 9, wherein each of the first position and the second position are determined based on, at least in part, information obtained from the one or more sensors.

12. The method of claim 8, wherein the visual indication is a representation of a small cell.

13. The method of claim 8, wherein the determining of the first set of parameters associated with the downlink signal additionally comprises displaying the first set of parameters on the user interface of the UE.

14. The method of claim 8, the method further comprising, prior to the determining the first set of parameters associated with the downlink signal:

determining a first set of parameters for each of a first approximate location and a second approximate location; and generate a recommended approximate small cell placement location for display on the user interface based on at least one parameter of the first set of parameters, wherein each of the first position and the second position are located within an area associated with the approximate small cell placement location.

15. The method of claim 14, the method further comprising, prior to generating the recommended approximate small cell placement location, determine a second set of parameters for each of the first approximate location and the second approximate location, the second set of parameters comprising at least one of a downlink speed of the first downlink signal and a uplink speed of the first uplink signal, wherein the recommended approximate small cell placement location is further based on and at least one parameter of the second set of parameters.

16. A non-transitory computer storage media storing computer-usable instructions that, when used by one or more processors, cause the one or more processors to:

determine, using one or more antennas of a user equipment (UE) for receiving a downlink signal from a first macro site and to communicate an uplink signal to the first macro site, a first set of parameters associated with the downlink signal for a first position of the UE and a second position of the UE, the first set of parameters representing at least one of a signal quality and a signal strength associated with the downlink signal;

determine the first set of parameters for each of a first approximate location and a second approximate location;

display, on the user interface, the first set of parameters in real time;

determine a second set of parameters for each of the first approximate location and the second approximate location, the second set of parameters comprising at least one of a downlink speed of the downlink signal and an uplink speed of the uplink signal;

determine, based on a comparison of the first set of parameters associated with the first position of the UE and the first set of parameters associated with the second position of the UE, that the first position is a wireless communication hotspot;

generate a recommended approximate small cell placement location for display on the user interface based on at least one parameter of the first set of parameters and at least one parameter of the second set of parameters, wherein each of the first position and the second position are located within an area associated with the approximate small cell placement location;

display, on the user interface, an image obtained from a camera in real time, wherein the camera is communicatively coupled to the UE, the image representing at least a portion of an environment comprising the first position and the second position; and display a visual indication on the user interface of the hotspot, the visual indication being superimposed on the image.

17. The non-transitory computer readable media of claim 16, wherein the first position comprises a first location and a first orientation and the second position comprises a second location and a second orientation, at least one of the second location and the second orientation being different than the first location and the first orientation.

18. The non-transitory computer readable media of claim 16, wherein the visual indication comprises a representation of the UE.

\* \* \* \* \*